United States Patent
Svaeren et al.

(10) Patent No.: US 12,371,263 B2
(45) Date of Patent: Jul. 29, 2025

(54) VENDING TRACK FOR PUSHABLE VEHICLE

(71) Applicant: Smarte Carte, Inc., St. Paul, MN (US)

(72) Inventors: Boerge Johan Svaeren, Minneapolis, MN (US); Daniel Leigh Otterson, Stacy, MN (US); Christopher Jay Rogney, Stacy, MN (US)

(73) Assignee: Smarte Carte, Inc., St. Paul, MN (US)

( * ) Notice: Subject to any disclaimer, the term of this patent is extended or adjusted under 35 U.S.C. 154(b) by 392 days.

(21) Appl. No.: 17/744,418

(22) Filed: May 13, 2022

(65) Prior Publication Data

US 2022/0363478 A1 Nov. 17, 2022

Related U.S. Application Data

(60) Provisional application No. 63/188,698, filed on May 14, 2021.

(51) Int. Cl.
*B65G 1/137* (2006.01)
*G07F 11/46* (2006.01)

(52) U.S. Cl.
CPC .............. *B65G 1/137* (2013.01); *G07F 11/46* (2013.01)

(58) Field of Classification Search
CPC ........ G07F 11/46; G07F 7/0627; B65G 1/137
USPC ........................................................ 194/205
See application file for complete search history.

(56) References Cited

U.S. PATENT DOCUMENTS

| | | | |
|---|---|---|---|
| 3,669,235 A * | 6/1972 | Breeden ................. | G07F 9/002 221/13 |
| 3,978,959 A | 9/1976 | Muellner | |
| 4,450,968 A | 5/1984 | Muellner | |
| 4,518,073 A | 5/1985 | Pastien | |
| 5,065,898 A * | 11/1991 | Michalewski .......... | B25B 23/04 221/241 |
| 5,526,916 A * | 6/1996 | Amdahl ................ | G07F 7/0627 194/211 |
| 5,921,373 A * | 7/1999 | Amdahl .................... | G07F 7/02 340/572.1 |
| 6,024,203 A | 2/2000 | Amdahl et al. | |
| 6,125,985 A * | 10/2000 | Amdahl ................ | G07G 1/0081 194/205 |
| 6,138,815 A * | 10/2000 | Reiners ................ | B66B 31/006 198/321 |
| 7,218,225 B2 * | 5/2007 | Wieth ................... | G07F 7/0636 340/568.5 |
| 7,434,674 B1 | 10/2008 | Bain | |
| 7,448,476 B2 | 11/2008 | Otterson | |
| 7,748,511 B1 | 7/2010 | Maher | |
| 10,037,689 B2 * | 7/2018 | Taylor ................. | G05D 1/0285 |
| 10,249,128 B1 * | 4/2019 | Yang ..................... | G07F 9/001 |
| 10,490,015 B2 * | 11/2019 | Katoozian ........... | G07F 17/0057 |

(Continued)

*Primary Examiner* — Michael Collins
(74) *Attorney, Agent, or Firm* — Merchant & Gould P.C.

(57) ABSTRACT

One or more vending tracks (e.g., for strollers, carts, or other such vehicles) can be indirectly coupled (e.g., wirelessly coupled) to a single kiosk managing the rental transaction. The kiosk does not store instructions or other data for operating the vending tracks. Rather, management of the vending tracks is handled by a controller that is external of the kiosk. The controller may be mounted to an exterior of the kiosk, to one of the tracks, or elsewhere. The controller connects (e.g., wirelessly couples) to a respective communications unit of each vending track.

20 Claims, 18 Drawing Sheets

(56) References Cited

U.S. PATENT DOCUMENTS

| | | | |
|---|---|---|---|
| 11,484,135 B2* | 11/2022 | Levin | G07F 7/0636 |
| 2006/0011220 A1* | 1/2006 | Mueller | B08B 3/022 |
| | | | 134/123 |
| 2007/0116038 A1* | 5/2007 | Holt | H04L 12/66 |
| | | | 370/252 |
| 2008/0210268 A1* | 9/2008 | Metheny | B60S 3/00 |
| | | | 134/95.2 |
| 2019/0042000 A1* | 2/2019 | Kasmieh | G06F 1/1684 |

* cited by examiner

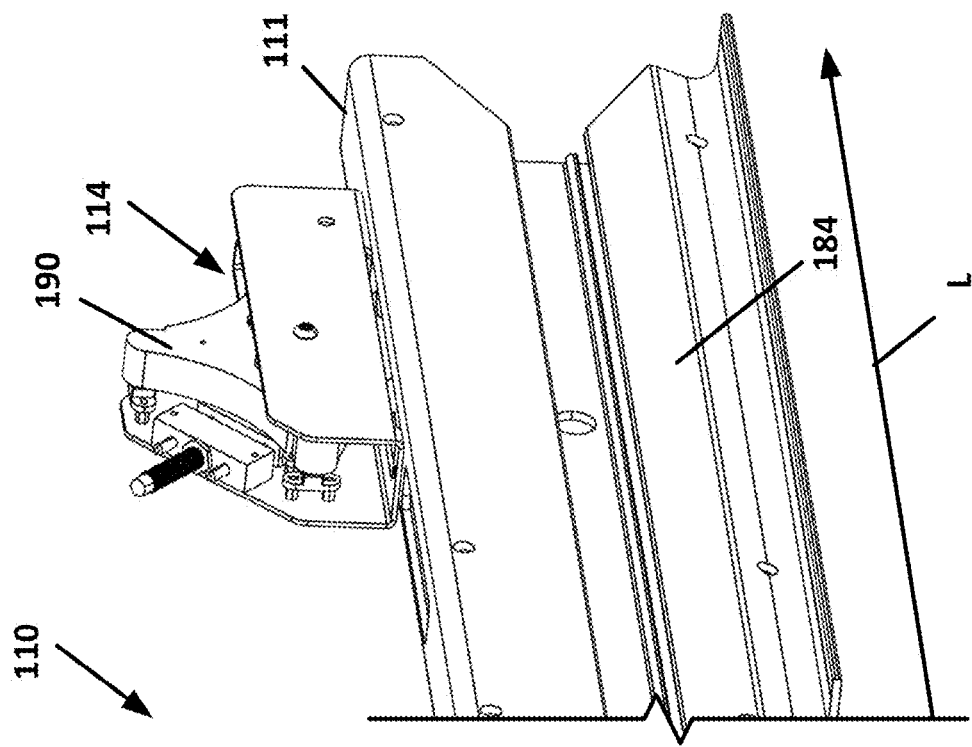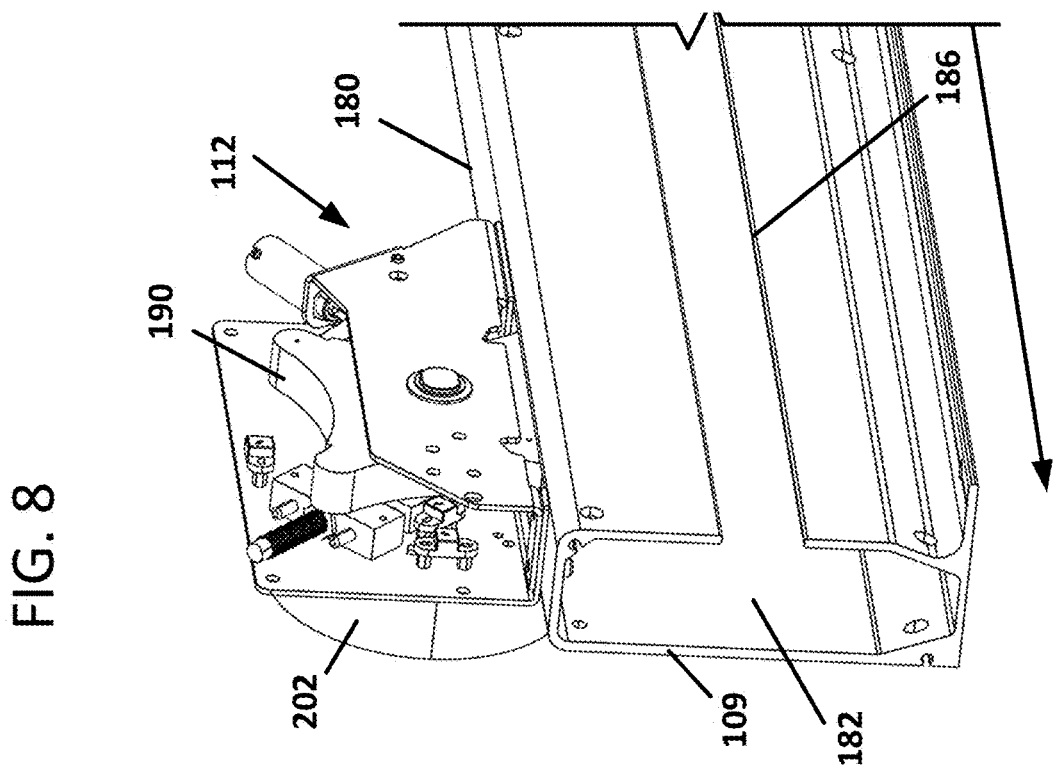
FIG. 8

VENDING TRACK FOR PUSHABLE VEHICLE

CROSS-REFERENCE TO RELATED APPLICATIONS

This application claims the benefit of U.S. Provisional Patent Application Ser. No. 63/188,698, filed May 14, 2021. The disclosure of the priority application in its entirety is hereby incorporated by reference into the presence application.

BACKGROUND

A large public facility such as an airport, mall, theme park, water park, or zoo may require hundreds or thousands of strollers, carts, or other wheeled, pushable vehicles to satisfy the demands of customers. However, the vehicles often become a nuisance as many customers do not return the vehicles to a central area after using them. Unreturned vehicles can be safety hazards and disrupt pedestrian and motor traffic. Rounding up and managing the wheeled, pushable vehicles can be time consuming and resource consuming.

Automated management systems have become popular for managing and vending a large number of wheeled, for pushable vehicles for use by the general public. These systems typically retain a number of vehicles within a track or rail, and allow for vending and return of vehicles without the need for a human attendant. An attendant is needed only to periodically check the system to collect currency and perform routine maintenance. Most such management systems use wheeled, pushable vehicles which are specifically designed for use in the systems. Many retain a wheel or a specialized "key" on the cart or other pushable vehicle. Consequently, most management systems are sold as complete systems having specialized equipment (e.g., cart management units housing vending electronics and machinery).

Improvements are desired.

SUMMARY

Some aspects of the disclosure are directed to vending systems including a vehicle vending unit and a track controller. The vehicle vending unit includes a track having a dispenser (e.g., an electro-mechanical) at a vending end. The track controller electronically stores the instructions for operating the dispenser. The track controller is configured to communicate with a kiosk that processes a rental transaction for the vehicle.

In some implementations, the track controller is mounted to an exterior of the kiosk. In other implementations, the track controller is mounted to the vehicle vending unit. In still other implementations, the track controller may be separate from both the kiosk and the vehicle vending unit.

In some examples, each vehicle vending unit includes a communications unit that controls operation of the dispenser of the track. The track controller communicates with the communications unit to control the dispenser through the communications unit. Multiple communications units can connect (e.g., cabled connection, wireless connection, etc.) to the same track controller. In other examples, each vehicle vending unit includes a respective track controller for communicating directly with a kiosk.

A variety of additional inventive aspects will be set forth in the description that follows. The inventive aspects can relate to individual features and to combinations of features.

It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 8 is a perspective view of an example track suitable for use with any of the vending systems described herein, a middle of the track being omitted for ease in viewing the end portions of the track;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
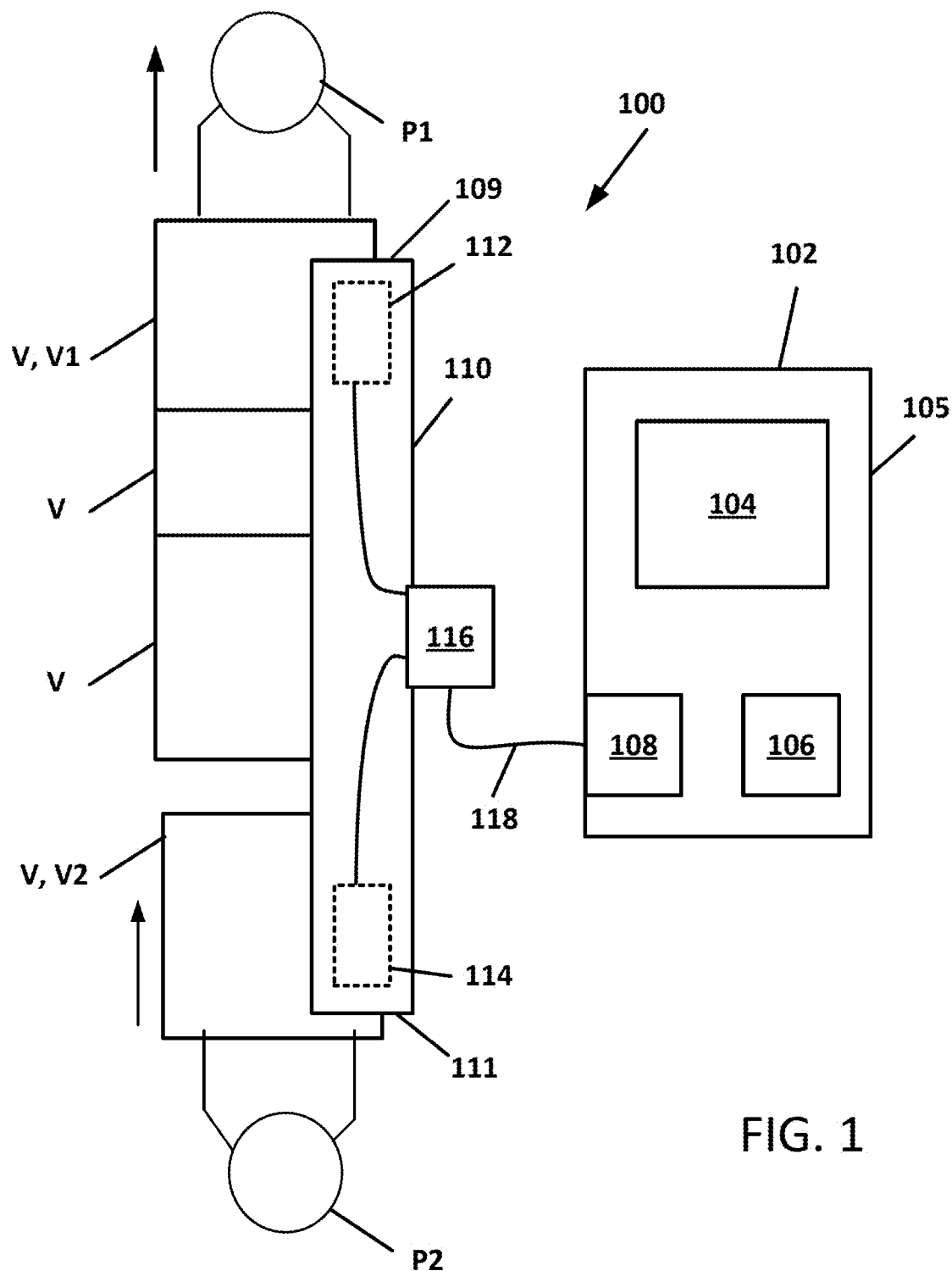
FIG. 1 illustrates an example vending system including a track, a track controller, and a kiosk configured in accordance with the principles of the present disclosure.

The present disclosure is directed to a vending system 100 for a wheeled pushable vehicle V such as a stroller, wheelchair, trolley, or cart. The vending system 100 includes a storage track 110 at which the pushable vehicles V are stored, a track controller 108 that operates the storage track 110, and a kiosk 102 at which a pushable vehicle V can be rented or authorization to obtain a pushable vehicle V can otherwise be obtained. The storage track 110 is configured to retain the pushable vehicles V until one has been rented or otherwise allocated. The track controller operates a dispenser 112 on the storage track 110 to release one of the pushable vehicles at the request of the kiosk 102. As shown in FIG. 1, a person P1 can obtain a pushable vehicle V from a dispenser 112 at the track 110. The kiosk 102 receives user input and determines when to authorize the track controller 108 to release a vehicle from the storage track 110.

In some implementations, the storage track 110 holds a plurality of vehicles V in a line. In FIG. 1, the storage track 110 forms a queue that dispenses vehicles V from a first end 109 and receives the vehicles V at a second end 111 (e.g., when person P2 returns a vehicle V). In other examples, the dispenser 112 is configured to also accept vehicles V into the track 110 so that acquisition and returns of the vehicles V are made at a common end of the track 110. In certain implementations, the vehicles V can nest together within the track 110. In certain examples, the storage track 110 includes a channel along which a portion of each vehicle V can glide until reaching a dispenser 112 at a first end 109 of the track 110. In one example, the channel is a wheel catch that receives one or more wheels of the vehicle V (e.g., see FIG. 8). In another example, the channel is configured to receive a non-wheeled, keyed protrusion from the vehicle V. For example, the channel may be configured to receive an adapter A mounted to the vehicle V (e.g., see FIGS. 15 and 18).

Figure 16:
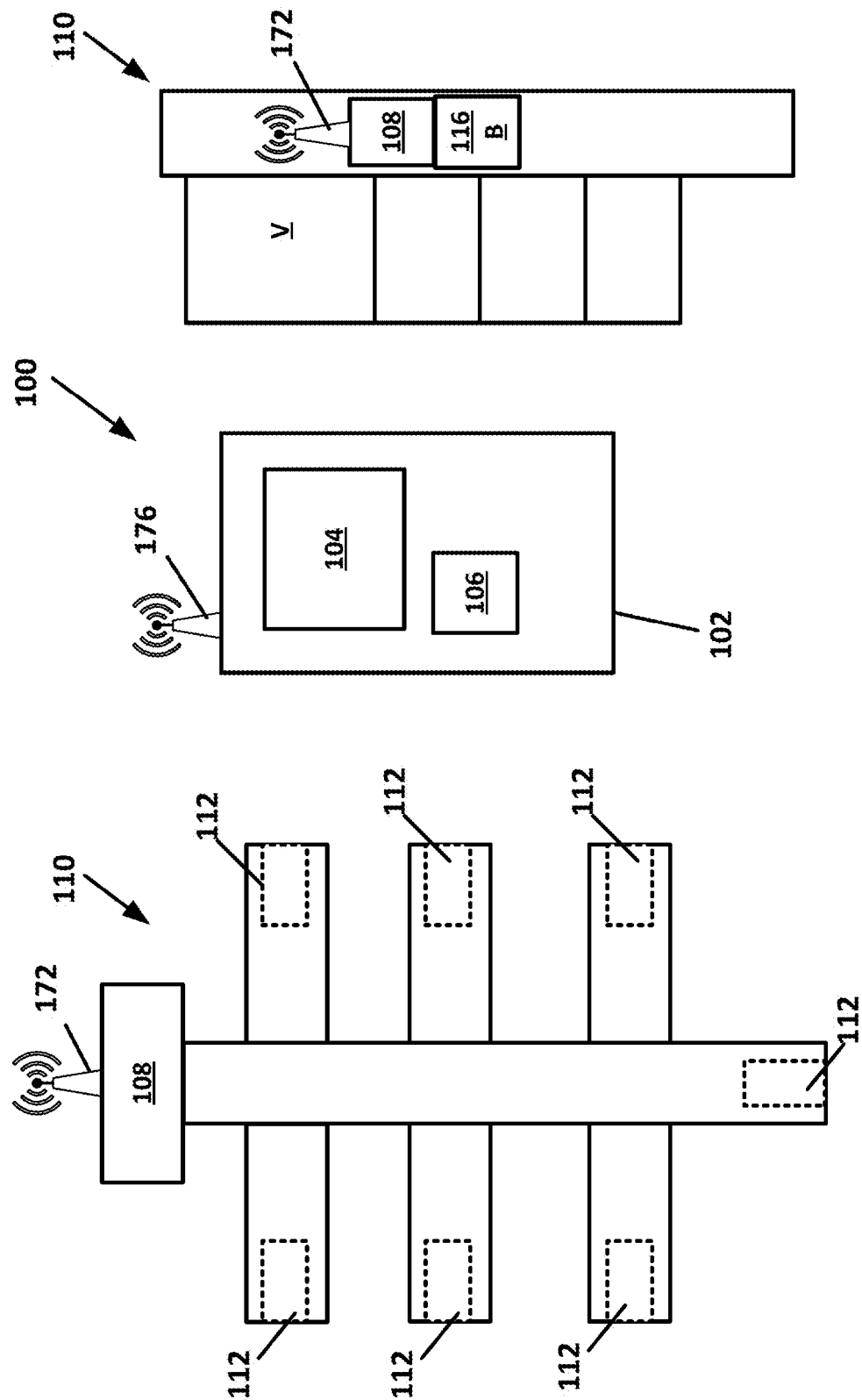
FIG. 16 is a schematic diagram of an example docking style track at which multiple pushable vehicles can be stored.

In other implementations, the storage track 110 includes a plurality of docking ports arranged along the storage track 110 (e.g., see FIG. 16). Each docking port has a respective dispenser 112 that selectively locks and release a vehicle V at the docking port. Additional information about various implementations for the docking port storage track 110 of FIG. 16 can be found in U.S. Pat. No. 7,434,674, the disclosure of which is hereby incorporated herein by reference in its entirety.

Referring still to FIG. 1, the kiosk 102 includes a body 105 having a display screen 104 at which rental/purchase information is displayed to the user (e.g., persons P1 and/or P2). The display screen 104 may display price information, rental instructions, terms and conditions, questions for the user (e.g., the number of vehicles V the user wishes to obtain), and other such information. In some implementations, the display screen 104 is a touch screen configured to read user input. In other implementations, the kiosk has another user interface such as a keyboard, buttons, trackball, mouse, touchpad, microphone, camera, or other type of user interface. In certain implementations, the kiosk 102 includes multiple types of user interfaces such as a touch screen 104 and camera.

The kiosk 102 also includes a payment acceptor 106 configured to accept payment for the rental/purchase. In some implementations, the payment acceptor 106 includes a card reader (e.g., for a credit card, debit card, gift card, etc.). In other implementations, the payment acceptor 106 includes a bill acceptor and/or change acceptor. In certain implementations, the payment acceptor 106 is configured to receive any of multiple types of payments.

The storage track 110 includes a dispenser 112 (e.g., at the first end 109 of the track 110). The dispenser 112 inhibits the removal of a vehicle V from the track V until a vehicle V has been rented or access is otherwise authorized. In certain examples, the dispenser 112 mechanically retains the vehicle V at the storage track 110. The storage track 110 also includes a communications unit 116 that is electrically connected to the dispenser 112 to directly operate the dispenser 112. For example, the communications unit 116 actuates the dispenser 112 to release a vehicle V. In certain implementations, the track 110 includes an acceptor 114 that is separate from the dispenser 112. For example, the acceptor 114 may receive a vehicle V at the second end 111 of the track 110. In some examples, the acceptor 114 inhibits guiding of the vehicle V into the track 102 until a return has been accepted or acknowledged by the vending system 100. In other examples, the acceptor 114 monitors how many vehicles can be stored at the track 110 so that the track controller 108 can monitor availability of the vehicles V. In certain examples, the communications unit 116 manages operation of the acceptor 114.

In certain implementations, the instructions for operating the dispenser 112 and the acceptor 114 are not stored at the communications unit 116. Rather, the instructions for operating the dispenser 112 and acceptor 114 are stored within the track controller 108, which is operationally coupled (e.g., through a wired or wireless connection) to the communications unit 116. In some implementations, the track controller 108 is mounted to the storage track 110. In other implementations, the track controller 108 is mounted to the kiosk 102. In some examples, the track controller 118 is mounted to an exterior of the kiosk. In other examples, the track controller 118 is mounted within an interior of the kiosk housing 105, but as a separate unit from the kiosk controls 107.

The same track controller 108 may operate multiple storage tracks 110 via the respective communications units 116. Storing the instructions with the track controller 108 instead of the communications unit 116 facilitates manufacturing and installation of the storage tracks 110. Less electronic memory is needed on the tracks 110 themselves. Rather, the tracks 110 need only include hubs that pass the instructions from the controller 108 to the electromechanical components on the track 110. Further, separating the track controller 108 from the kiosk controls 107 provides flexibility to incorporate multiple types of kiosks 102 in the vending system 100. The kiosk 102 need not be programmed with any instructions or data pertaining to operation of the tracks 110. Rather, the kiosk 102 would need only to provide user interface services and payment services. Accordingly, the tracks 110 can work with any desired kiosk 102 based on a simple communications protocol (e.g., a dispense command from the kiosk 102 and a confirmation or error message from the track controller 108).

Figure 2:
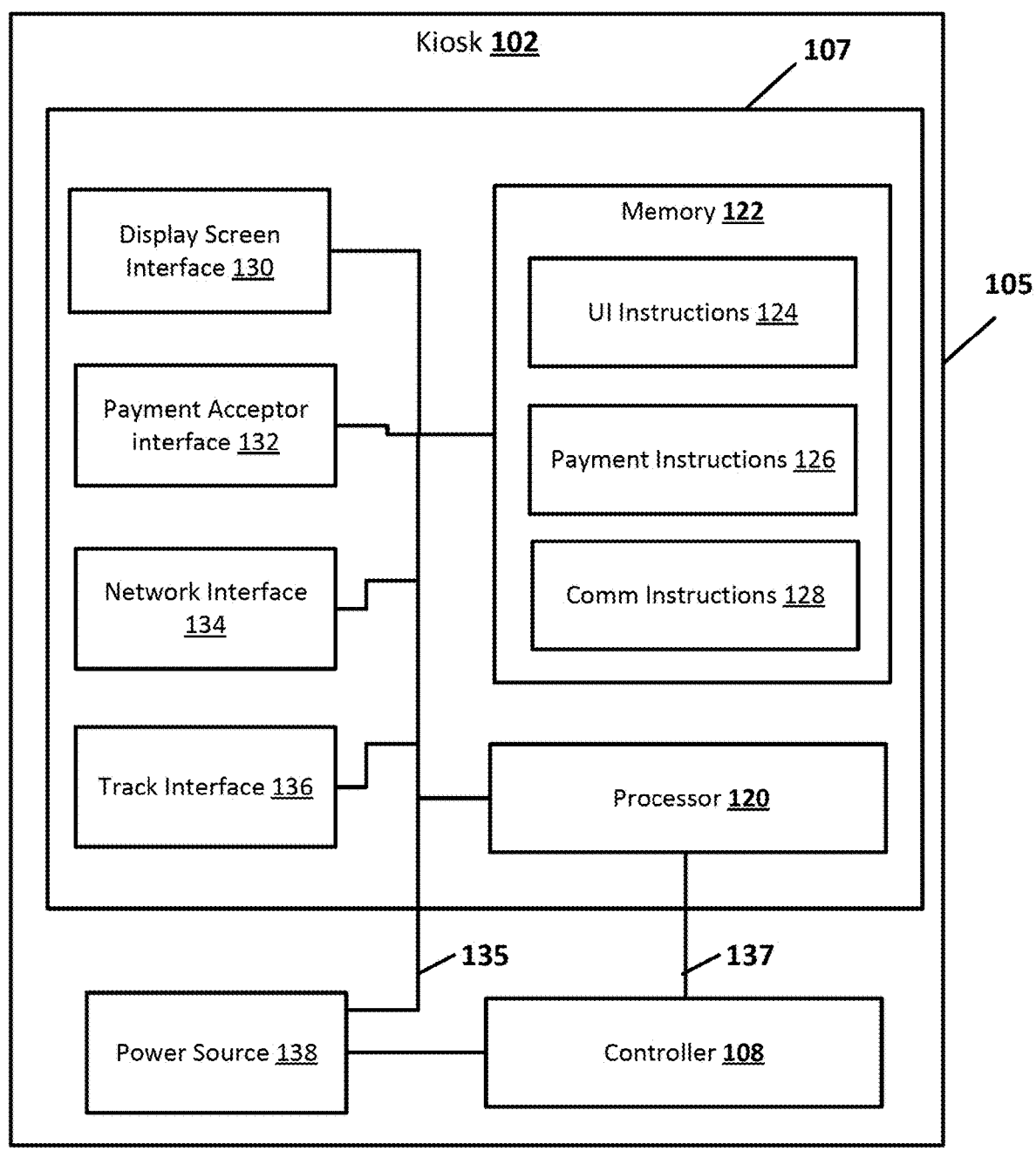
FIG. 2 is a schematic diagram of an example kiosk suitable for use in the vending system of FIG. 1.

FIG. 2 is a schematic diagram of an example kiosk 102 suitable for use in the vending system 100 of FIG. 1. The kiosk 102 includes a housing 105 in which kiosk controls 107 are contained. In certain implementations, a track controller 108 also can be accommodated within the kiosk body 105. In some implementations, a power source 138 such as a battery also can be accommodated within the kiosk body 105. In other implementations, the power source 138 is a power cable configured to connect to an AC power outlet.

The kiosk controls 107 include a processor 120 (i.e., formed from one or more local processors) and memory 122 that stores various instructions to be implemented by the processor 120 to vend the vehicles V. For example, the memory 122 of the kiosk 102 may store instructions 124 for presenting various user interfaces to users (e.g., person P1 and person P2) at the display screen 104, instructions 126 for operating the payment acceptor 106, and instructions 128 for communicating with the track controller 108.

The kiosk controls 107 also include a display screen interface 130 that enables the processor 120 to control the display screen 104 of the kiosk 102, a payment acceptor interface 132 that enables the processor 120 to control the payment acceptor 106, a network interface 134 that enables the processor 120 to connect to an external network (e.g., to a local network, to the Internet, etc.), and a storage track interface 136 that communications with the track controller 108. The processor 120, memory 122, and the various interfaces 130, 132, 134, 136 may be electrically coupled together via a bus 135 or other electric or electronic circuitry. In certain examples, the electronic components within the kiosk 102 (e.g., the kiosk controls 107 and/or the track controller 108) are powered by the power source 138 (e.g., a battery, a plug to a local AC outlet, a power supply coupled to either a battery or an outlet, etc.).

The network interface 134 of the kiosk 102 allows for updates to be obtained from a network (e.g., the Internet or a local network (e.g., a LAN, a WAN, a cloud network, etc.). In certain implementations, the network interface 134 provides reports to the network on inventor changes (e.g., how many vehicles V have been rented, how many vehicles V have been dispensed, how many vehicles V have been returned).

In certain implementations, the memory 122 of the kiosk controls 107 does not store instructions for operating the track 110 (e.g., for operating the dispenser(s) 112 or the acceptor 114 of the storage track 110). Rather, the memory 122 stores instructions for communicating with the track controller 108 via the track interface 136. For example, the memory 122 may store instructions for indicating to the track controller 108 that a vehicle V has been rented or that access to a vehicle V has otherwise been authorized.

Figure 3:
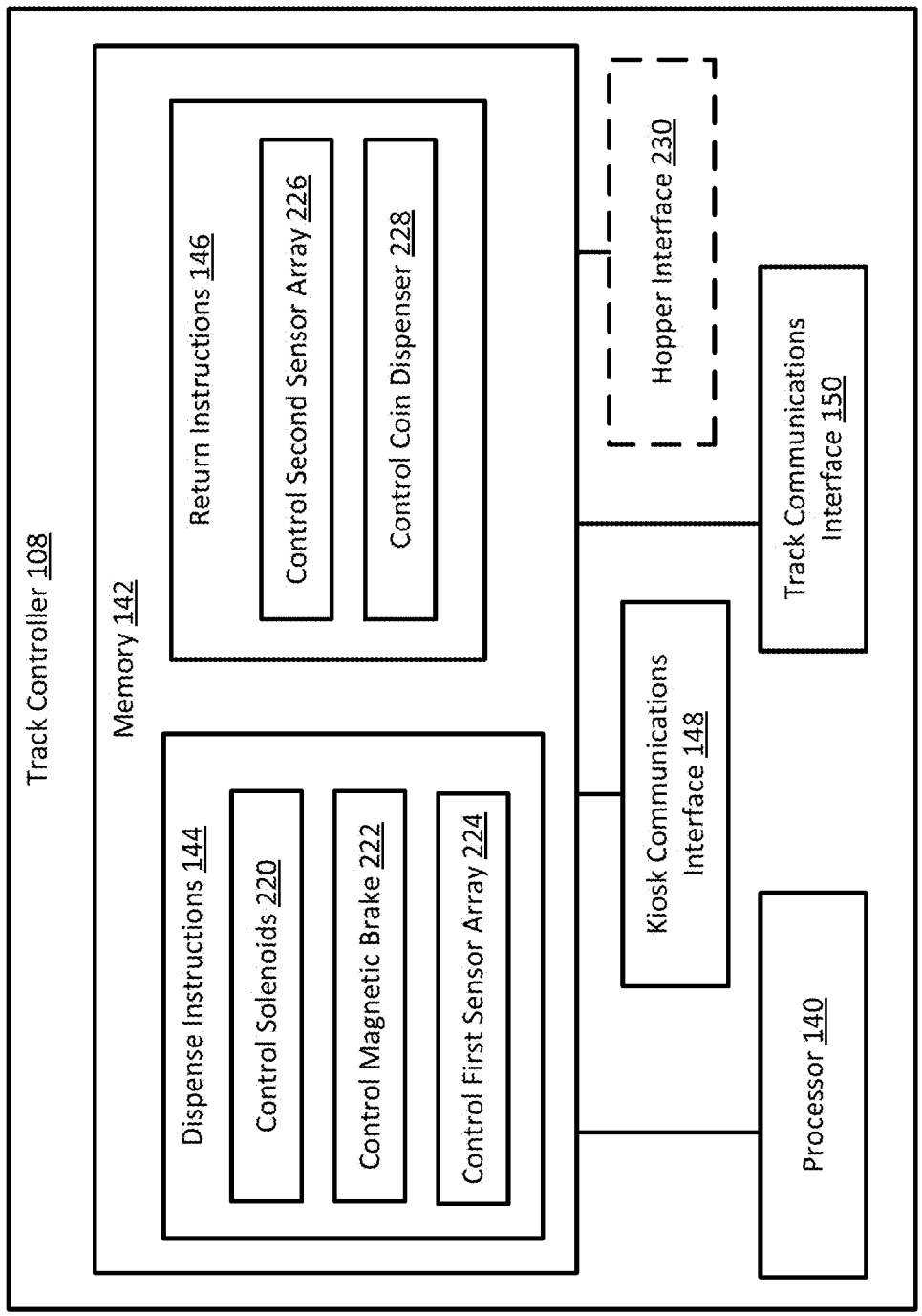
FIG. 3 is a schematic diagram of an example track controller configured in accordance with the principles of the present disclosure and suitable for use in the vending system of FIG. 1.

FIG. 3 is a schematic diagram of an example track controller 108 suitable for use in the vending system 100 of FIG. 1. The track controller 108 includes a processor 140 and memory 142 that stores various instructions to be implemented by the processor 140 to operate the track 110. The track controller 108 also includes a kiosk communications interface 148 that communicates (e.g., through a cabled connection 118 or a wireless connection) with the track interface 136 of the kiosk 102. In some implementations, the kiosk communications interface 148 is hardwired to the track interface 136 of the kiosk controls 107. In other implementations, the kiosk communications interface 148 is cabled (see cable 137 in FIG. 2) to the track interface 136. In still other implementations, the kiosk communications interface 148 is wirelessly connected to the track interface 136 (e.g., via transceivers or other wireless communication devices at the kiosk 102 and track controller 108).

The memory 142 of the track controller 108 stores instructions 144 for dispensing a vehicle V from the storage track 110. The memory 142 also may store instructions 146 for confirming a vehicle V has been returned and optionally for rewarding a user for returning the vehicle V (e.g., by dispensing a coin or token). The track controller 108 may include a track communications interface 150 that communicates (e.g., through a cabled connection or wirelessly) with the communications unit 116 at the storage track 110 to control the dispenser. In certain examples, the track controller 108 may include a hopper interface 230 that communicates with a hopper 115 (FIG. 4) at the storage track 110 to dispense a reward. In other examples, the track controller 108 may control dispensation of the reward through the communications unit 116 at the storage track 110.

Figure 4:
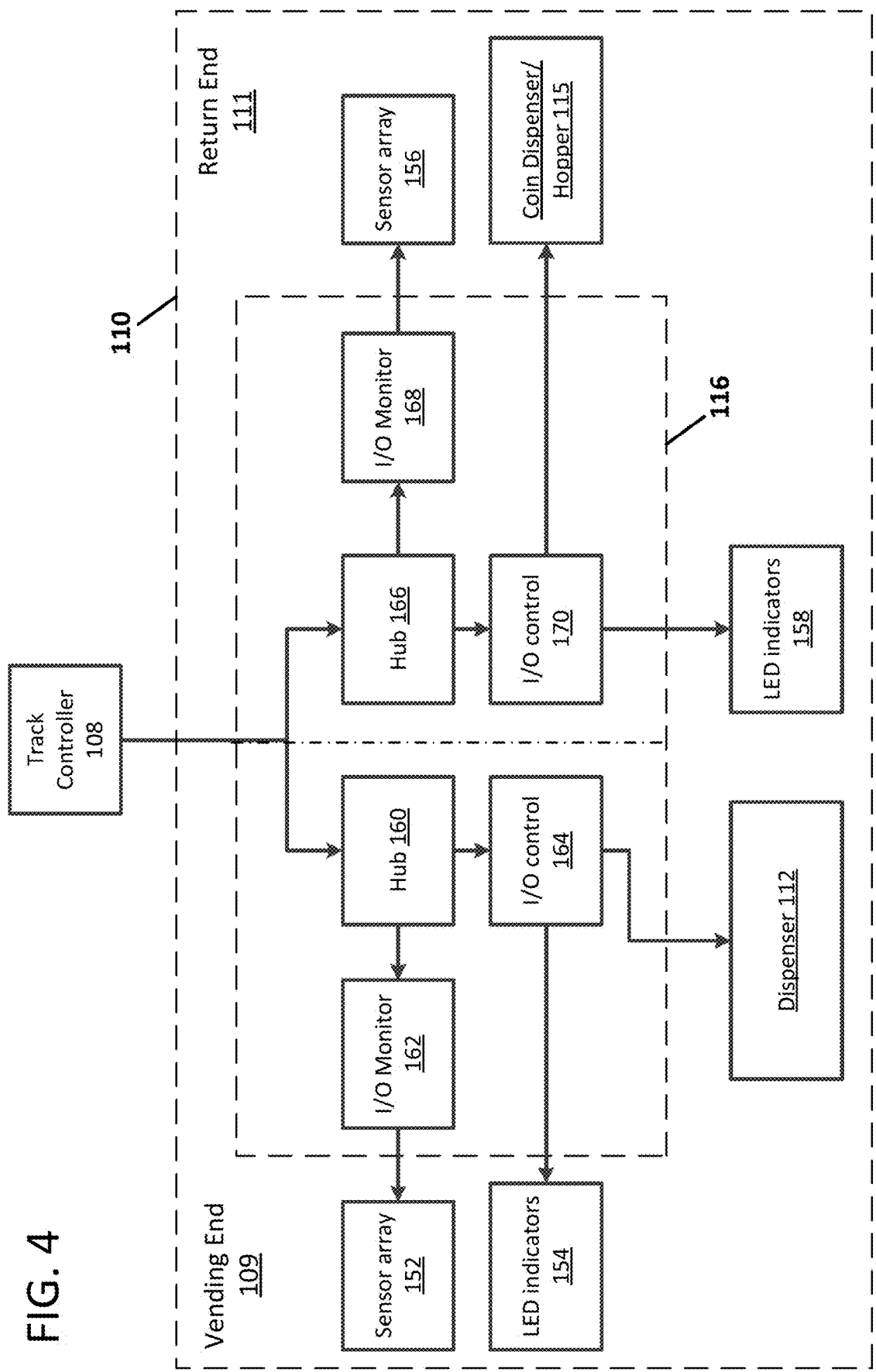
FIG. 4 is a schematic diagram of an example communications unit configured in accordance with the principles of the present disclosure and suitable for use in the vending system of FIG. 1.

FIG. 4 is a schematic diagram of an example storage track 110 including an example communications unit 116 configured to direct operations on a track 110. In the example shown, the storage track 110 has a dispenser 112 at a dispensing end 109 of the track 110 and an acceptor 114 at a return end 111 of the track 110. In certain implementations, each end 109, 111 of the track 110 also includes a respective sensor array 152, 156 that determines whether the respective dispenser 112 or acceptor 114 has been actuated. In certain implementations, the vending end 109 of the storage track 110 also includes an indicator 154 (e.g., a visual indicator such as a light indicator (e.g., LED), an audible indicator such as a speaker, etc.) to indicate that the storage track 102 is ready to dispense a vehicle V. In certain implementations, the return end 111 of the track 110 also includes an indicator 158 (e.g., a visual indicator such as a light indicator, an audible indicator such as a speaker, etc.) to indicate that the track 102 has received a returned vehicle V and optionally that a reward has been dispensed.

The communications unit 116 includes a hub 160 (e.g., a local processor and communications interface) configured to communicate with the track controller 108 to receive instructions from the track controller 108 and to pass data (e.g., data from sensor array 152) to the track controller 108. The hub 160 communicates with an I/O monitor 162 and an I/O control 164 of the communications unit 116. The I/O monitor 162 manages the sensor array 152 (e.g., obtains readings from the sensor array 152, optionally processes the obtained readings, and sends the readings to the hub 160). The I/O controller 164 enables actuation of the dispenser 112, an example of which will be described in more detail herein. The I/O controller 164 also may operate the indicator 154. In an example, the hub 160 is implemented using a VINT Hub Phidget chip offered by Phidgets Inc. In an example, the I/O monitor 162 is implemented using a 4x Digital Input Phidget chip. In an example, the I/O controller 164 is implemented using a 2x DC Motor Phidget chip offered by Phidgets Inc. Other implementations are possible.

In some implementations, the hub 160, I/O monitor 162, and I/O controller 164 also operate the sensor array 156, indicators 158, and acceptor 114 at the return end 111 of the track 110. In other implementations, the hub 160 may control a respective return-side I/O monitor 168 and return-side I/O controller 170. In still other implementations, the communications unit 116 includes a second hub 166 that controls the return-side I/O monitor 168 and the return-side I/O controller 170 (see FIG. 4). The second hub 166 is configured to communicate with the track controller 108 to receive instructions (e.g., to monitor actuation of the acceptor 114 or to dispense a reward for returning the vehicle V) from the track controller 108 and to pass data (e.g., data from sensor array 156) to the track controller 108. For example, the second hub 166 may send a communication to the track controller 108 that the acceptor 114 has received a vehicle V. In certain examples, the acceptor 114 may inhibit insertion of a vehicle V into the track 110 until the user has completed a return procedure at the kiosk 102.

Figure 5:
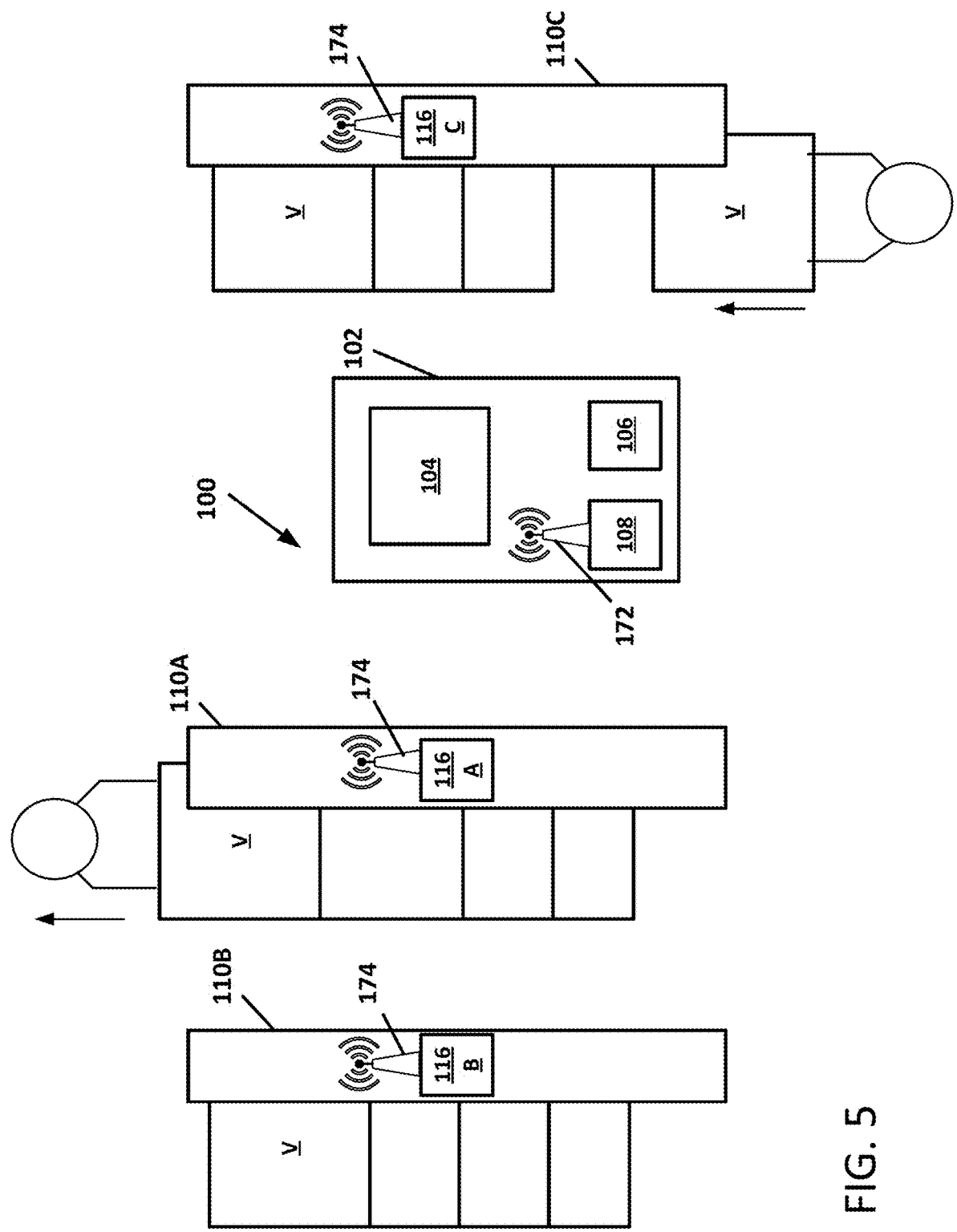
FIG. 5 illustrates another example vending system including multiple tracks wirelessly coupled to an example kiosk.
Figure 6:
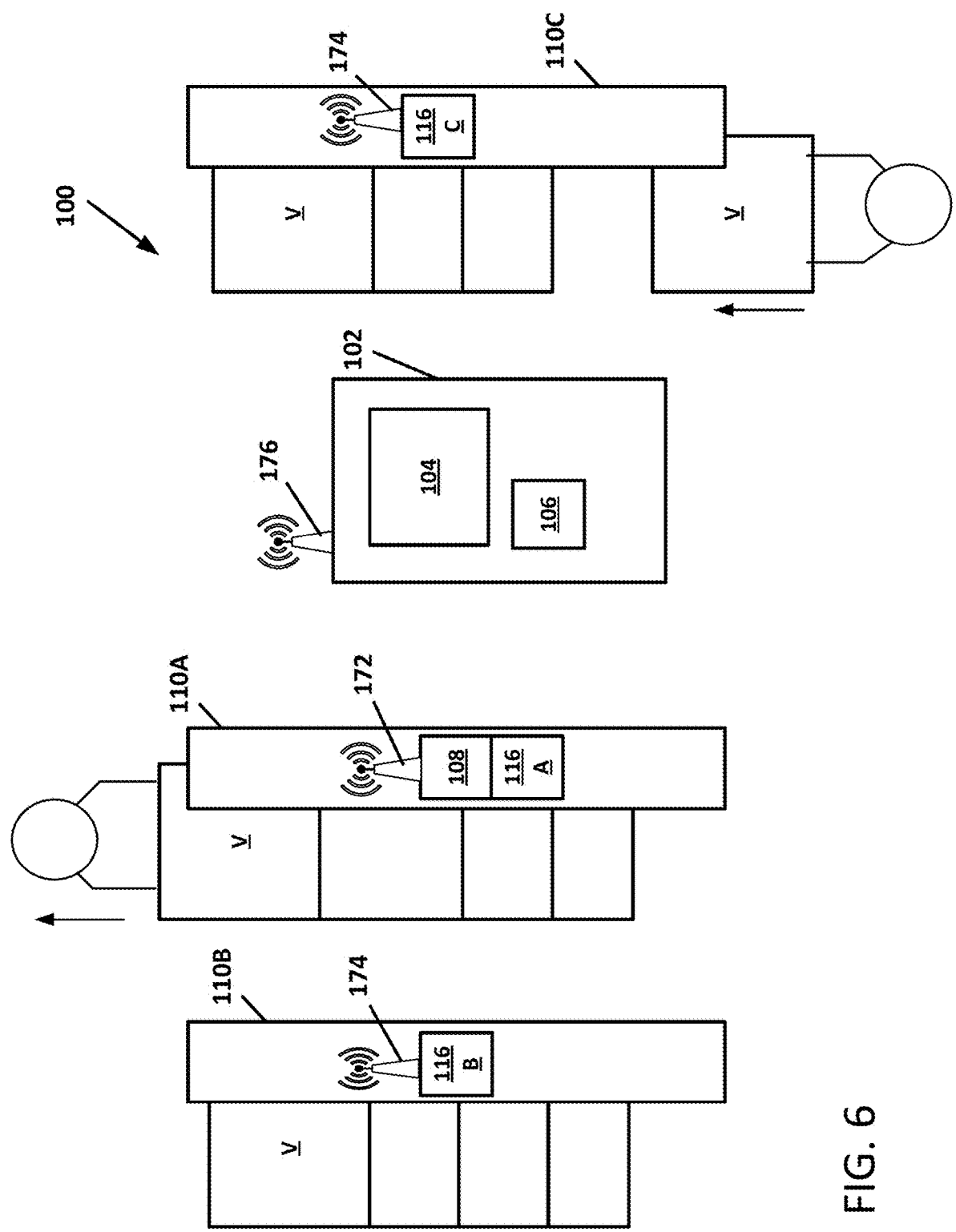
FIG. 6 illustrates another example vending system in which the track controller is separate from the kiosk.
Figure 7:
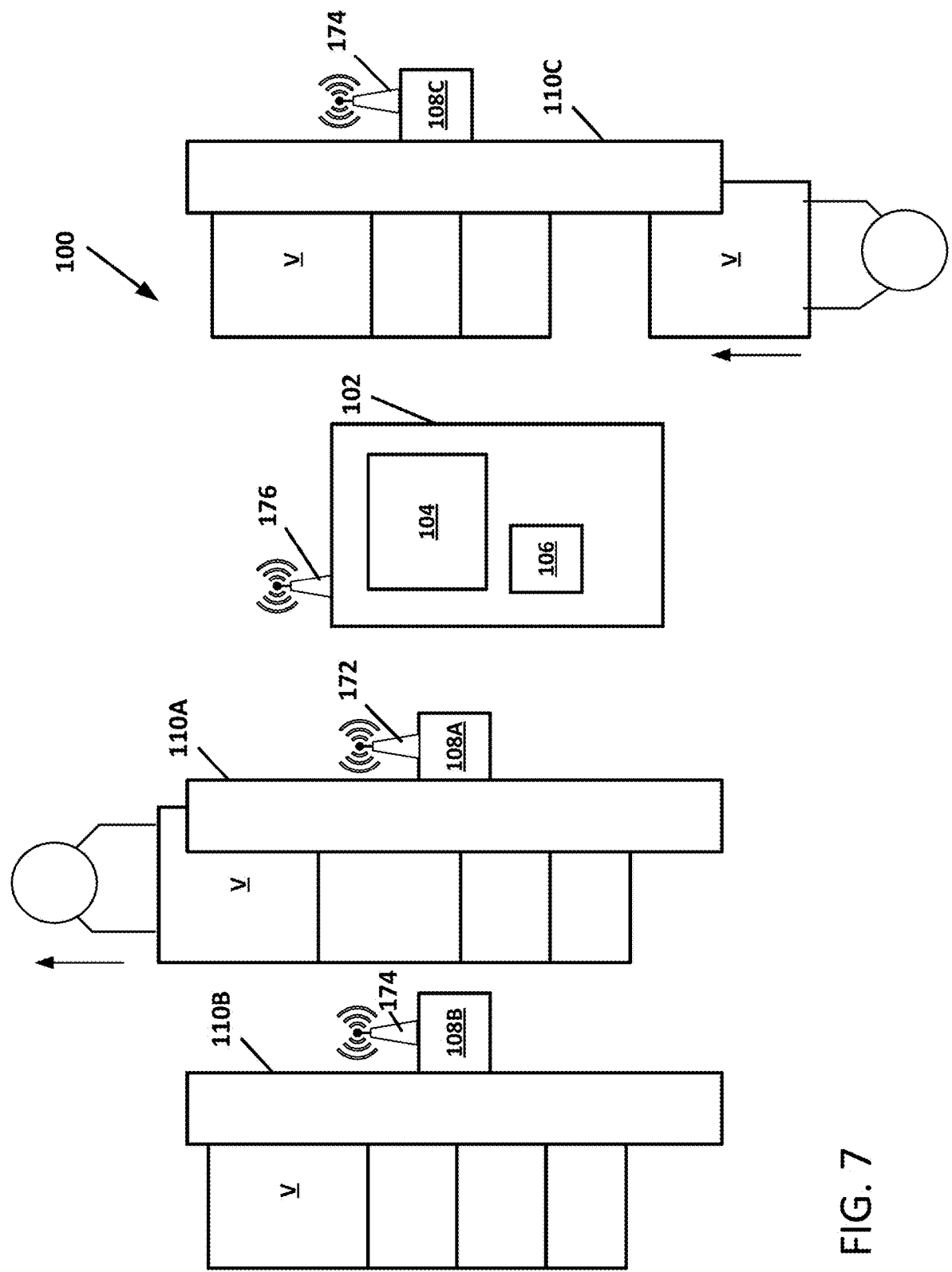
FIG. 7 illustrates another example vending system in which each track includes a respective track controller to communicate with a kiosk.

FIGS. 5-7 illustrate other example vending systems 100 in which multiple tracks 110A, 110B, 110C are serviced by one kiosk 102. Accordingly, a single kiosk 102 may provide a user interface and payment authentication services for multiple (i.e., two or more) tracks 110A, 110B, 110C. In some implementations, each track 110A, 110B, 110C dispenses the same type of vehicle V. In other implementations, one or more of the tracks 110A, 110B, 110C may dispense different types of vehicles V (e.g., single-seater, vs. double-seater, different colors, different body styling, etc.). In some examples, the tracks 110A, 110B, 110C are the same (e.g., are all queue style tracks, are all dock style tracks, etc.). In other examples, the tracks 110A, 110B, 110C may be different types (e.g., see FIG. 16).

After payment is received at and accepted by the kiosk 102, the kiosk 102 communicates with the track controller 108 to dispense a vehicle V from one of the tracks 110A, 110B, 110C. In some implementations, the user may select a track 110A, 110B, 110C from which to obtain a vehicle V. For example, if vehicles of different colors or stylings are randomly mixed on the tracks 110A, 110B, 110C, then a user may select the track 110A, 110B, 110C at which a desired vehicle V is next in line to be dispensed. In another example, the track controller 108 determines from which track 110A, 110B, 110C to vend the vehicle V. For example, if the first track 110A holds single-seater vehicles V and the second track 110B holds double-seater vehicles V, and if the user selects a single-seater vehicle V at the kiosk 102 via the display screen interface 130, then the track controller 108 may trigger the first track 110A to dispense a vehicle V.

In FIGS. 5 and 6, multiple communications units 116A, 116B, 116C are communicatively connected to the same track controller 108, which is in communication with the kiosk 102. In certain implementations, instructions for controlling the dispenser 112, acceptor 114, and other track components are stored only on the track controller 108. Accordingly, the tracks 110 can work with any desired kiosk 102 based on a simple communications protocol. In FIG. 7, multiple track controllers 108 are communicatively coupled to the same kiosk 102.

In FIG. 5, the track controller 108 is still attached to the kiosk 102 and separate from the kiosk controls 107. The track controller 108 includes a transceiver or other wireless communication device 172 that communicates with respective transceivers or other wireless communication devices 174 at the communications units 116A, 116B, 116C. The vending system configuration of FIG. 5 provides flexibility in fitting the vending system into spaces of various sizes and shapes to better accommodate the needs of users. The tracks 110A, 110B, 110C can be disposed in columns, rows, stars, or in any other desired pattern. The kiosk 102 can be freely positioned relative to the tracks 110A, 110B, 110C so that the kiosk 102 can be pushed against a wall, placed within an alcove, or otherwise positioned out of the way of the tracks 110.

In FIG. 6, the track controller 108 is separate from the kiosk body 105 and is wirelessly connected or cabled to the kiosk 102. In the example shown, the track controller 108 is coupled to one of the tracks 110A, 110B, 110C instead of directly to the kiosk 102. In other examples, the track controller 108 could be mounted separate to both the kiosk 102 and the tracks 110 (e.g., beneath the ground, in a ceiling, behind a wall, or otherwise out of the way).

Further, the kiosk 102 includes a transceiver 176 or other wireless communication device for communicating with the track controller 108. For example, the kiosk 102 may confirm receipt of payment or otherwise indicate to the track controller 108 that a vehicle V should be dispensed. The track controller 108 may then communicate with the communications units 116A, 116B, 116C of the tracks 110A, 110B, 110C to actuate the dispensers 112 and acceptors 114 in normal operation. As noted above, wireless communication between the kiosk 102, the track controller 108, and the communications units 116A-116C enhances flexibility in laying out the vending system 100.

In some examples, the track controller 108 is hardwired to the communications unit 116A of the track 110A carrying the track controller 108. In other examples, the track controller 108 is a separate part that can be installed on any track 110. For example, the track controller 108 may wirelessly communicates with the communications units 11A, 116B, 116C of all tracks 110A, 110B, 110C in the vending system 100 regardless of the placement of the track controller 108. Alternatively, the track controller 108 may be cabled to the communications unit 116A. Making the track controller 108 a separate part from the track 110 simplifies manufacturing by making all tracks 110 the same.

In FIG. 7, each track 110 includes a separate track controller 108 that stores instructions for operating the track 110. Each track controller 108 integrates the features of the communications unit 116 of the previous figures. Accordingly, the track controller 108 both communicates with the kiosk 102 and manages operations of the electro-mechanical parts, sensor arrays, and other components of the track 110. Therefore, the tracks 110 can be manufactured, purchased, and installed as a standalone unit and interfaced with any desired kiosk programmed with a basic communications protocol. After the track 110 is laid out and powered, no further installation work (e.g., such as installing a separate controller) is needed. Further, if one track breaks, the other tracks may continue working. In some examples, the track controllers 108 are mounted to exteriors of the tracks 110. In other examples, the track controllers 108 can be mounted to an interior portion of the track for protection and/or aesthetics.

Figure 9:
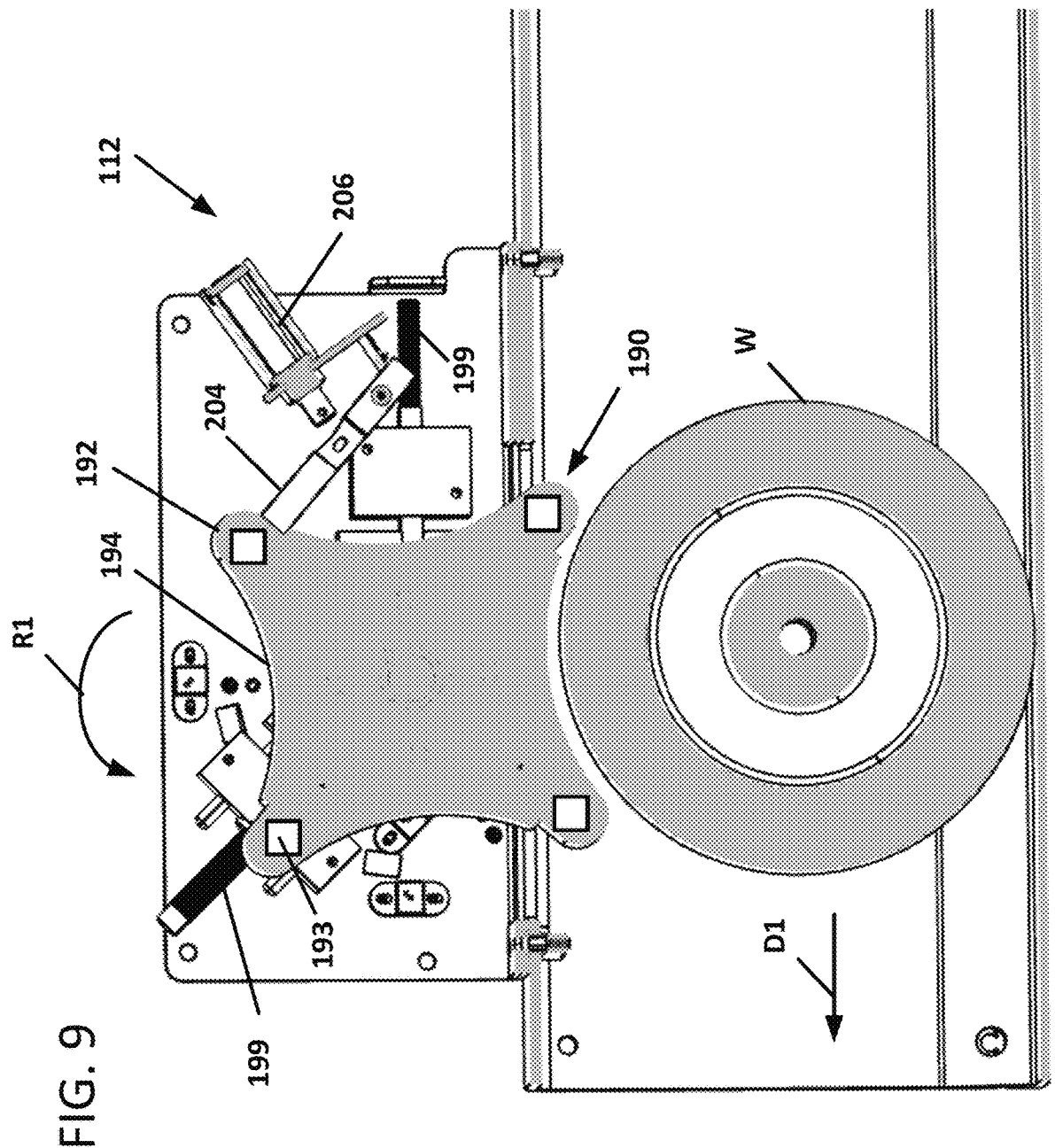
FIG. 9 is an axial cross-sectional view of the vending end of the track of FIG. 8 wherein an example wheel is shown in a holding position relative to a dispenser of the pushable vehicle.
Figure 10:
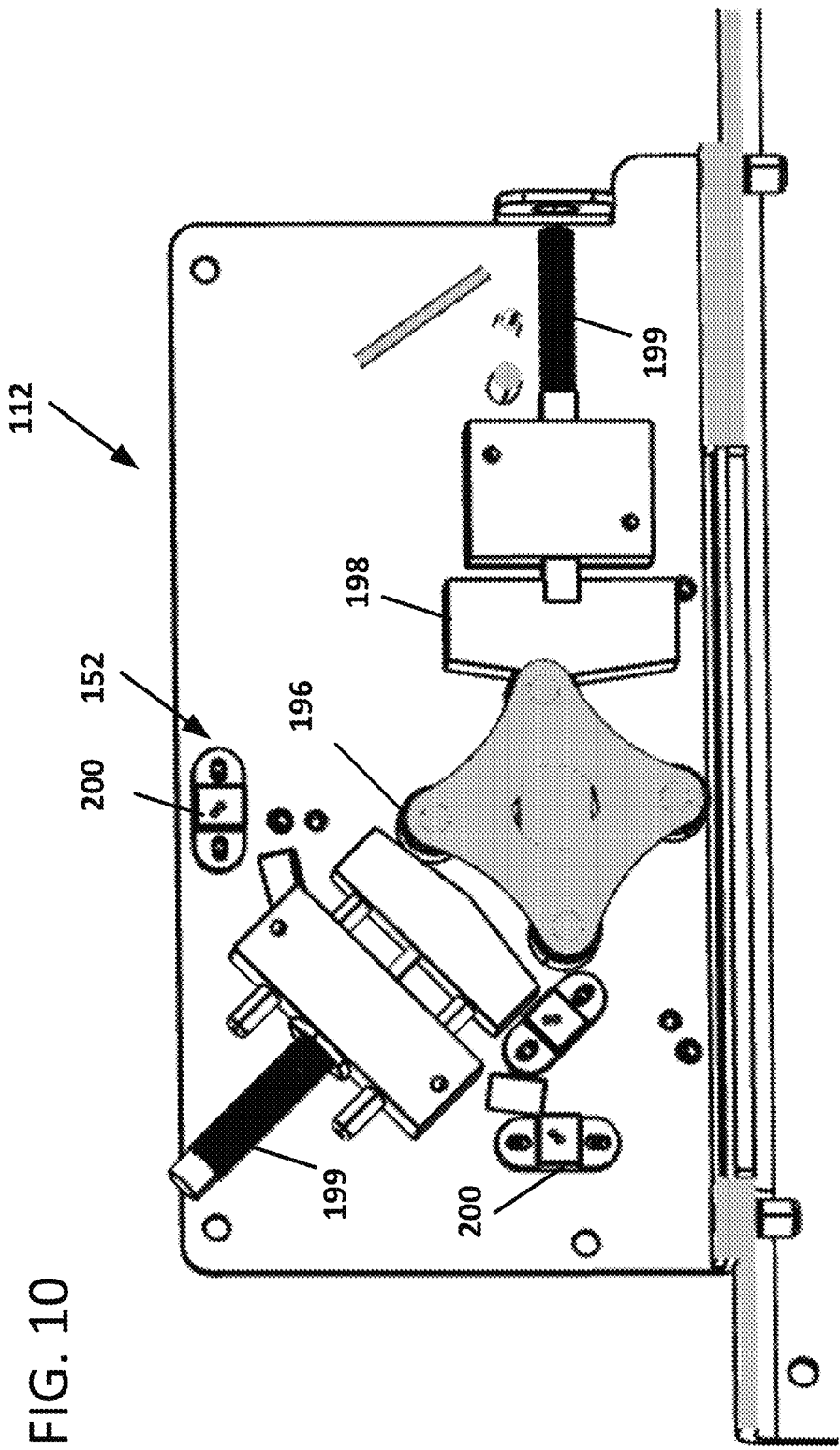
FIG. 10 illustrates some of the components of the dispenser of FIG. 9.

FIGS. 8-10 illustrate an example implementation of a track 110 suitable for use in any of the vending systems 100 disclosed above. The track 110 extends along a length L between a vending end 109 and a return end 111. The track 110 includes a body 180 defining a channel or through passage 182 sized to receive one or more wheels W (see FIG. 9) of the vehicle V. In certain implementations, the body 180 includes wrap-around portions 184 that extend around a majority of the wheel(s). In certain examples, the track body 180 defines a slot 186 through which a wheel axle may be cantilevered or otherwise may extend to connect to the remainder of the vehicle V.

As shown in FIG. 9, the dispenser 112 includes an electro-mechanical component that is electronically actuated to selectively lock and release a vehicle V within the track 110. A user manually moves the vehicle V along the track 110 to the dispenser 112. When a transaction for the vehicle V has been made (e.g., a vehicle rental has been completed), the dispenser 112 enables the removal of a vehicle V from the track 110. In the example shown, the dispenser 112 includes a paddle wheel 190 including spokes 192 and recesses 194 between the spokes 192. The recesses 194 are sized to accommodate a portion of the wheel W of one of the vehicles V. Accordingly, a vehicle V is released from the track 110 by rotating the paddle wheel 190 about 90 degrees to move one of the recesses 194 from facing inward towards the track 110 to facing outward away from the track 110.

In certain implementations, the paddle wheel 190 is configured to be indexed into one of a plurality of pre-determined positions when moved. As shown in FIG. 10, one or more alignment blocks 198 can be spring biased (e.g., see springs 199) to maintain the paddle wheel 190 in one of the pre-determined positions when not being actively moved. The alignment blocks 198 are shaped to fit within the recesses 194 between the spokes 192. In the example shown, the paddle wheel 190 is configured to stop in one position for each recess 194 (e.g., four positions in the example shown in FIG. 10).

The dispenser 112 locks and unlocks rotation of the paddle wheel 190 based on commands from the track controller 108. When locked, the paddle wheel 190 will not rotate. When released, the paddle wheel 190 is configured to rotate as a user pulls or pushes a vehicle V past the paddle wheel 190. In certain implementations, the dispenser 112 automatically locks the paddle wheel 190 against rotation after the paddle wheel 190 has been indexed one position.

Referring to FIGS. 8 and 9, the dispenser 112 includes a mechanism to inhibit indexing of the paddle wheel 190. In certain implementations, the dispenser 112 includes a magnetic brake 202 (FIG. 8) that, when activated, inhibits movement of the magnets 193 in the paddle wheel 190, thereby inhibiting rotation of the paddle wheel 190. The track controller 108 passes instructions through the hub 160 to deactivate the magnetic brake 202 when a vehicle transaction (e.g., rental) has been performed. In certain implementations, the dispenser 112 includes a mechanical blocker moved (e.g., pivoted) between blocking and releasing positions by a solenoid 206. The blocker 204 engages one of the spokes 192 of the paddle wheel 190 when in the blocking position and disengages the paddle wheel 190 when in the release position. In FIG. 9, the blocker 204 is shown in the blocking position. The track controller 108 passes instructions through the hub 160 to actuate the solenoid 206 to move the mechanical blocker 204. In certain implementations, the dispenser has the magnetic brake 202, the blocker 204 and solenoid 206, or a combination of the two.

Referring to FIGS. 11-14, the dispenser 112 monitors the number of vehicles V removed from the track 110. In some implementations, the dispenser 112 senses the vehicles V themselves (e.g., reads indicia (e.g., a barcode, an RFID tag, etc.) as the vehicle V passes the sensor). In other implementations, the dispenser 112 monitors the forward (and optionally rearward) indexing of the paddle wheel 190. The vending system 100 infers that a vehicle V has been removed from the track 110 when the paddle wheel 190 is indexed in a forward rotational direction R1. In certain examples, the vending system 100 infers that a vehicle V has been returned to the track 110 when the paddle wheel 190 is indexed in a rearward rotational direction R2. Sensing movement of the paddle wheel 190 may result in more accurate inventory management based on the lack of false readings.

In certain such implementations, the dispenser 112 senses the magnets 193 carried by the paddle wheel 190. Sensors 200 (e.g., Hall effect sensors) of the sensor array 152 are disposed around the paddle wheel 190 to sense the position of the magnets 193. The sensors 200 are electrically coupled to the I/O monitor 162 of the communications unit 116. Data from the sensors 200 can be processed (e.g., at the hub 160 or at the track controller 108) to determine that the paddle wheel 190 has been indexed.

In certain implementations, the paddle wheel 190 is able to rotate in opposite rotational directions R1, R2. In such implementations, the magnets 193 and sensors 200 are arranged so that the direction of rotation of the paddle wheel 190 can be determined from the sensor data. In certain implementations, each spoke 192 of the paddle wheel 190 has a different arrangement of magnets 193. Accordingly, the data from the sensors 200 can determine the position of the paddle wheel 190. The position of the paddle wheel 190 is stored in memory at least until the paddle wheel 190 is rotated. When the wheel 190 is rotated, the position of the paddle wheel 190 is compared to the previous position of the paddle wheel 190 to determine a rotational direction R1, R2 in which the paddle wheel 190 moved.

Figure 11:
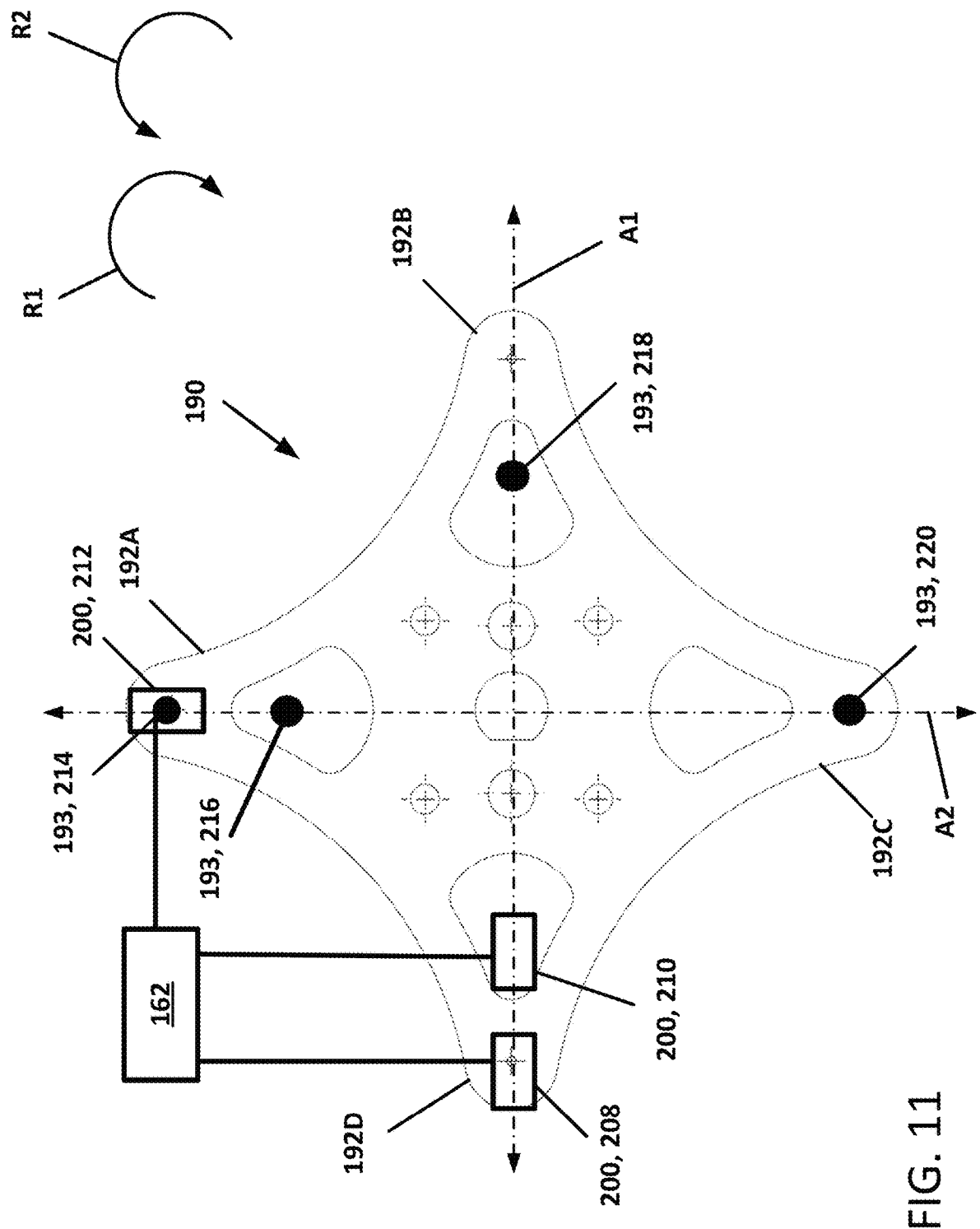
FIG. 11 illustrates the paddle wheel of the dispenser in a first position, the magnets and sensors shown schematically over the paddle wheel.

For example, FIG. 11 shows a paddle wheel 190 having four spokes 192. A first of the spokes 192A has a magnet 214 disposed at an outward position on the first spoke 192A and a magnet 216 disposed at an inward positon on the first spoke 192A. A second of the spokes 192B has an inwardly disposed magnet 218. A third of the spokes 192C has an outwardly disposed magnet 220. A fourth of the spokes 192D has no magnets. As further shown in FIG. 11, the sensor arrangement 200 includes three sensors—a first sensor 208, a second sensor 210, and a third sensor 212. In the example shown, the first and second sensors 208, 210 are aligned along a first reference axis A1 and the first sensor 212 is disposed along a second reference axis A2 that is perpendicular to the first reference axis A1. The first and third sensors 208, 212 are each configured to sense an outwardly disposed magnet 214, 220 when the magnet is aligned with the sensor (e.g., the sensor turns on when the magnet is disposed over the sensor). The second sensor 210 is configured to sense an inwardly disposed magnet 216, 218 when the respective spoke is aligned with the sensor.

Figure 12:
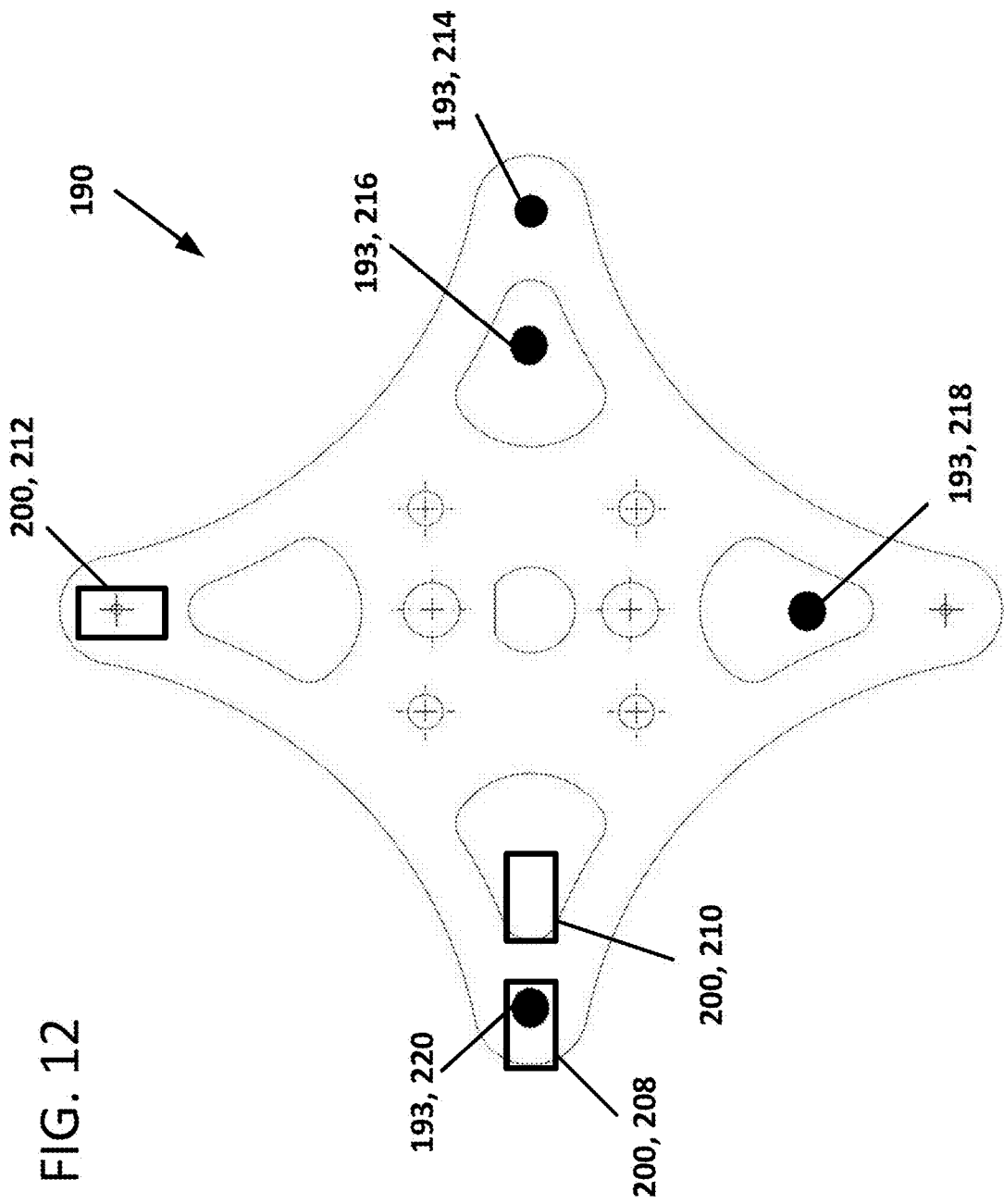
FIG. 12 shows the paddle wheel of FIG. 11 indexed to a second position.
Figure 13:
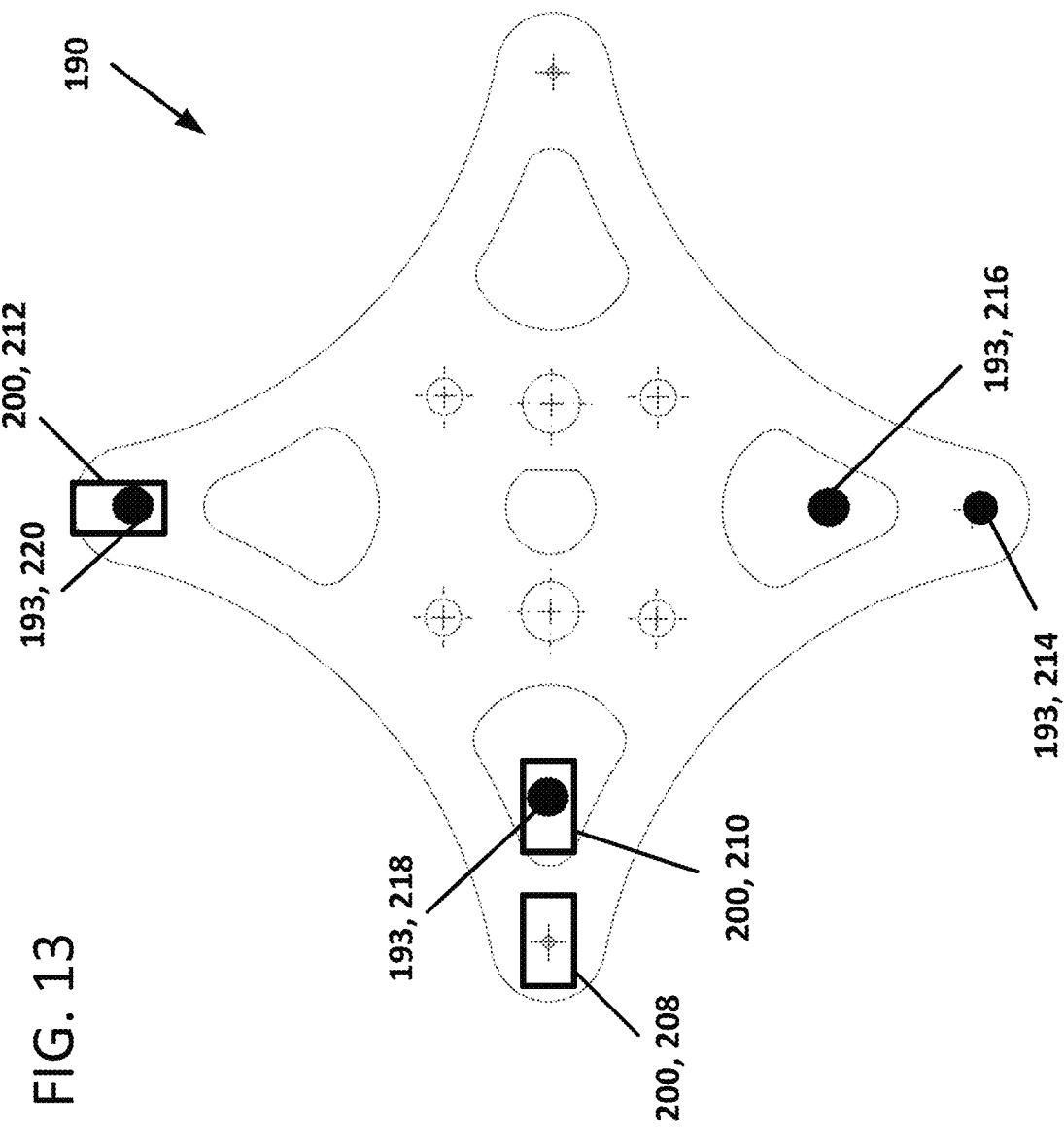
FIG. 13 shows the paddle wheel of FIG. 11 indexed to a third position.
Figure 14:
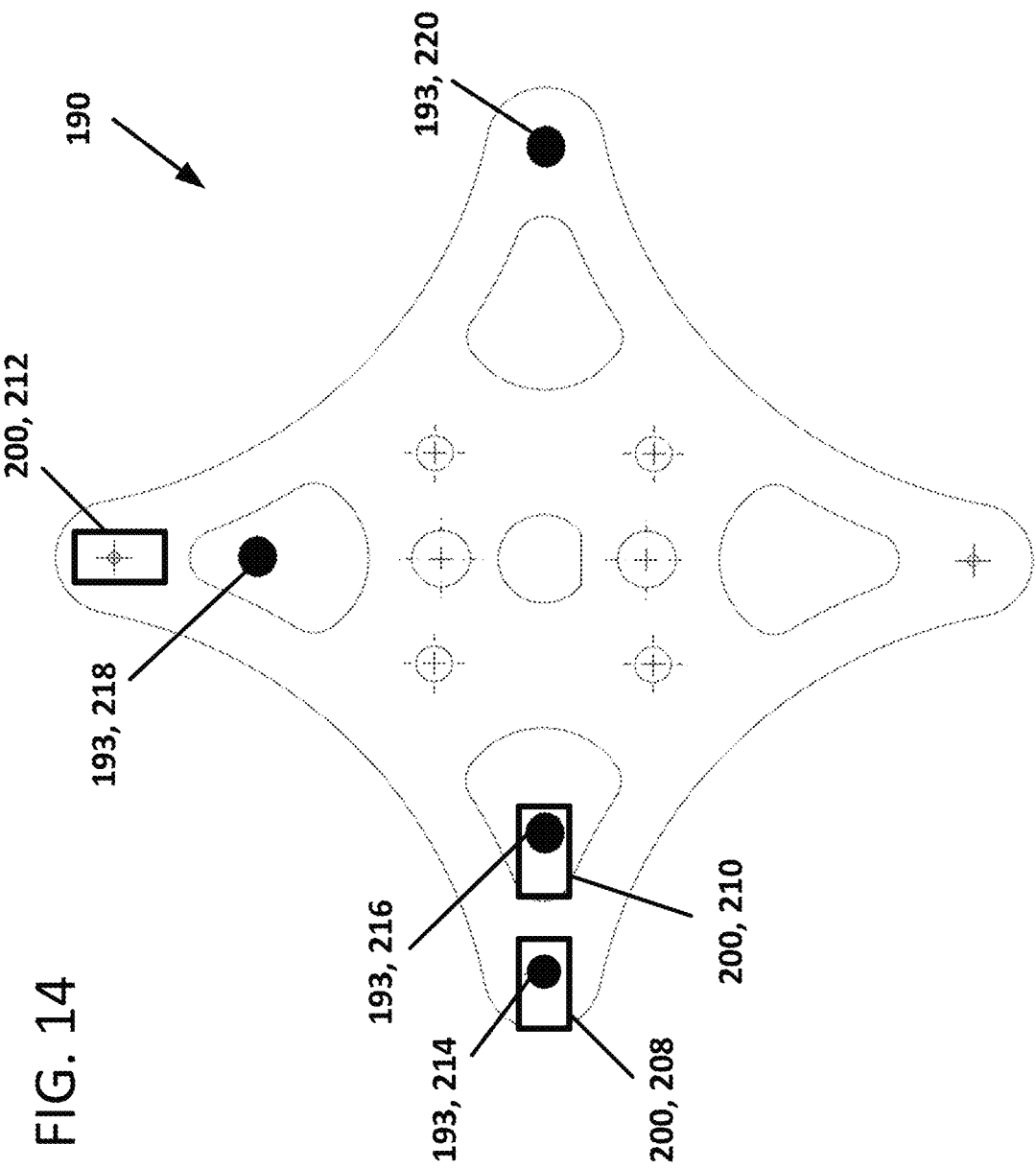
FIG. 14 shows the paddle wheel of FIG. 11 indexed to a fourth position.

FIG. 11 shows the paddle wheel 190 disposed in a first position in which no magnets 193 align with the first and second sensors 208, 210 and the outwardly disposed magnet 214 aligns with the third sensor 212. FIG. 12 shows the paddle wheel 190 indexed to a second position. The outwardly disposed sensor 220 aligns with the fist sensor 208 and no magnets align with the second and third sensors 210, 212. FIG. 13 shows the paddle wheel 190 indexed to a third position. The inwardly disposed sensor 218 aligns with the second sensor 210 and the outwardly disposed magnet 220 aligns with the third sensor 212. FIG. 14 shows the paddle wheel 190 indexed to a fourth position. The outwardly disposed sensor 214 aligns with the first sensor 208 and the inwardly disposed sensor 216 aligns with the second sensor 210. The sensor readings for such an example are summarized in the below table.

| Position | Sensor 1 | Sensor 2 | Sensor 3 |
|---|---|---|---|
| 1 | OFF | OFF | ON |
| 2 | ON | OFF | OFF |
| 3 | OFF | ON | ON |
| 4 | ON | ON | OFF |

Because the sequence of sensor positions is known, the vending system 100 can determine whether the paddle wheel 190 is indexed forwardly or rearwardly by determining whether the signal readings have moved forwardly or rearwardly in the sequence.

In certain implementations, the acceptor 114 at the return end 111 of the track 110 includes a similar or same type of paddle wheel 190 and sensor array 156 (e.g., see FIG. 8). The sensor array 156 monitor magnets within the acceptor paddle wheel 190 to determine when the paddle wheel 190 has been indexed by a vehicle V being passed therethrough. Accordingly, the sensors at the dispenser 112 and acceptor 114 enable accurate inventory management. In certain implementations, the acceptor 114 does not include a magnetic brake 202 or a blocker 204 and solenoid 206. Rather, the acceptor 114 may include a ratchet, sprag clutch, or other mechanism to inhibit rotation in one direction while allowing rotation in the opposite direction. Accordingly, vehicles V can be freely inserted into the track 110 past the acceptor 114, but cannot be pulled out of the track 110 through the acceptor 114. In other implementations, the dispenser 112 functions as an acceptor by allowing rearward indexing of the paddle wheel 190.

Figure 15:
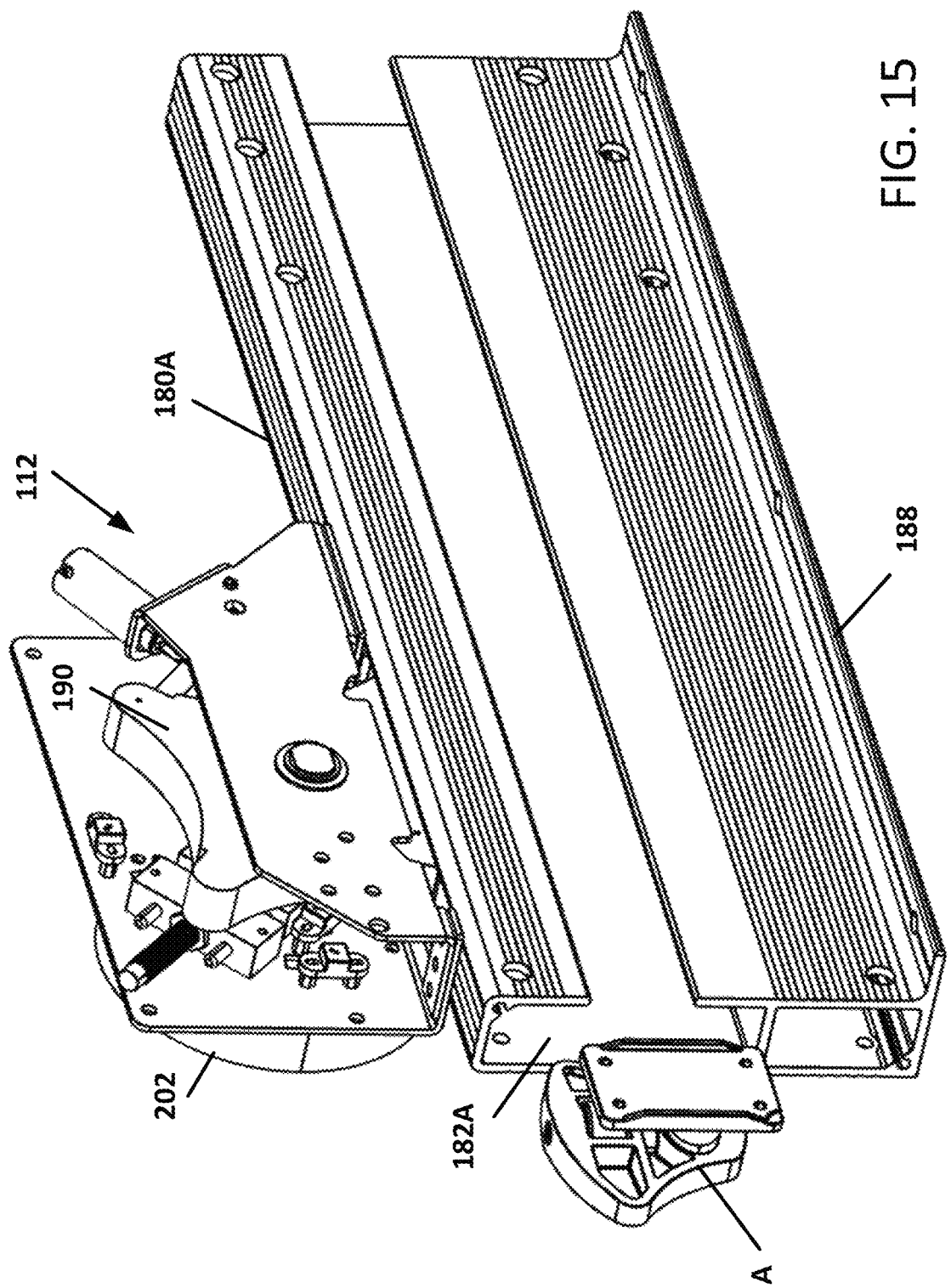
FIG. 15 is a perspective view of a first end of another example track suitable for use with any of the vending systems described herein, the track being configured to catch an adapter protruding from a pushable vehicle.

As shown in FIG. 15, the same dispenser 112 described above can be applied to a track 180A configured to receive an adapter A or other protrusion in place of the wheel of the vehicle V. The adapter A or other protrusion includes a surface that mated with the recesses 194 of the paddle wheel 190. The dispenser 112 functions in the same way in blocking and releasing the paddle wheel 190 to enable a vehicle V to pass thereby. In some examples, the adapter A includes an enlarged head cantilevered off the vehicle V (e.g., see FIG. 15). In other examples, the adapter A defines a channel C along which a portion of the track 110 slides (e.g., see FIG. 18). In the example shown, the track 180A for receiving the adapter A is configured to mount directly to the ground (e.g., a floor within a building, a dirt or paved surface outside, etc.). For example, fasteners (e.g., screws, bolts, rivets, etc.) can be inserted through a mounting flange 188. In other examples, the track 180A can be elevated (e.g., on poles).

Figure 17:
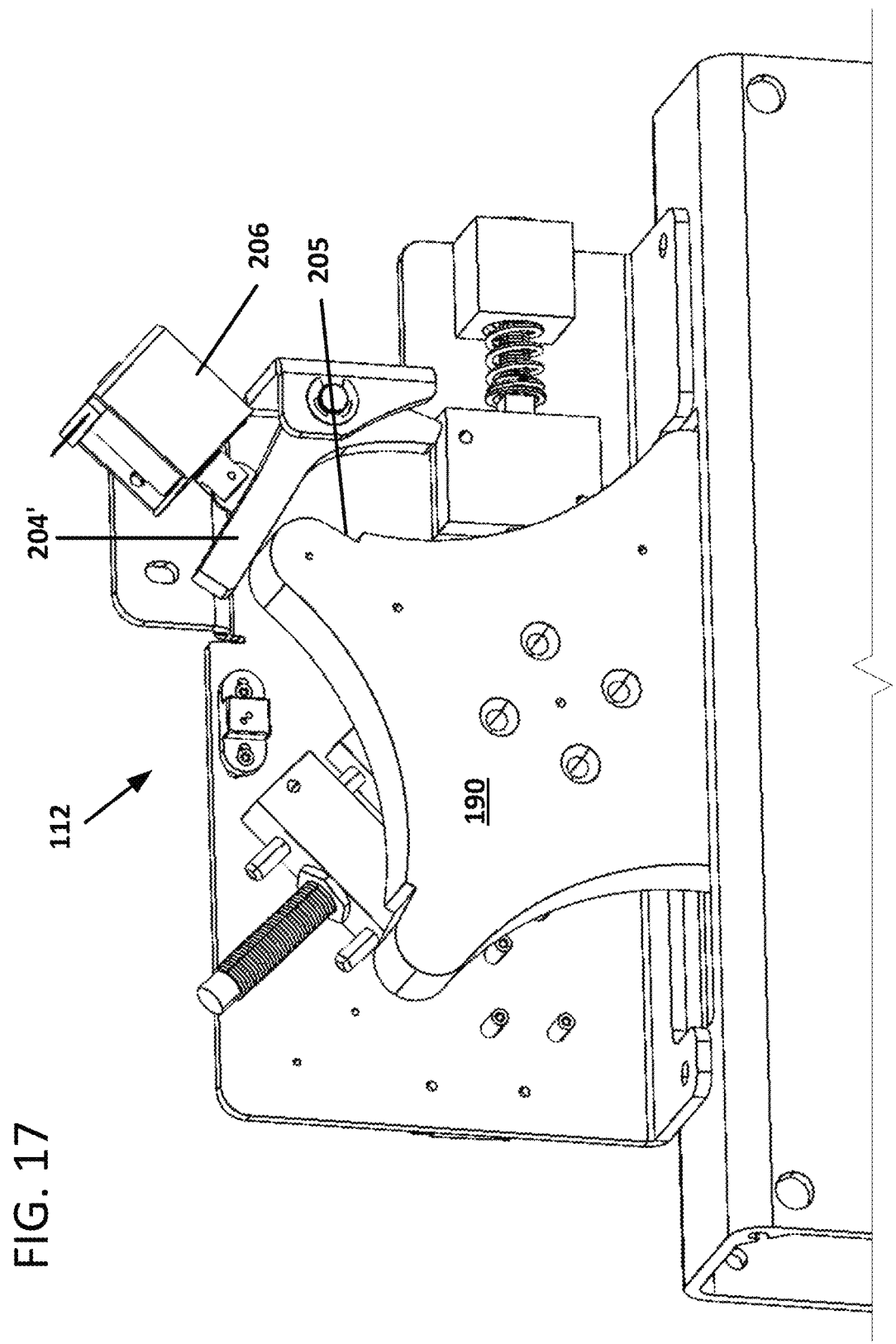
FIG. 17 is a perspective view of an example dispenser suitable for use with any of the tracks disclosed herein.

FIG. 17 shows an alternative dispenser 112' suitable for use with any tracks 110 (e.g., track body 180, track body 180A, etc.) disclosed herein. The dispenser 112' also a magnetic brake 202, a mechanical blocker 204', and a driver (e.g., a solenoid) 206. However, the mechanical blocker 204' is bent (e.g., to an L-shape). The bent shape enables a paddle wheel spoke 192 to push past the mechanical blocker 204' while a vehicle V is being dispensed, even if power is not supplied to the solenoid 206. Accordingly, turning off the power will allow the vehicles V to be freely dispensed from the track 110 (instead of requiring power to dispense a vehicle V).

In certain examples, the paddle wheel 190 defines notches 205 at the spokes 192 size to receive a free end of the mechanical blocker 204'. When the mechanical blocker 204' engages the notch 205 of one of the spokes 192, the mechanical blocker 204' blocks a reverse indexing of the paddle wheel 190, thereby preventing a cart from entering the track 110. In certain examples, the mechanical blocker 204' is spring-biased into an engagement position in alignment with the notches 205 of the paddle wheel 190. In certain examples, the solenoid 206 can pull the mechanical blocker 204' into a release position (e.g., see FIG. 17) in which the spokes 192 of the paddle wheel 190 can rotate past the mechanical blocker 204' to allow reverse indexing of the paddle wheel 190. Accordingly, one or more carts could be loaded onto the track 110 while the mechanical blocker 204' is in the release position and the magnetic brake is disengaged.

In certain implementations, the track controller 108 is configured to enable a user to return a vehicle V to the track 110 at the same end of the track 110 from which the vehicle V was dispensed. For example, upon the track controller 108 receiving confirmation of an intended return from the kiosk 102 via the track interface 136 and kiosk communications interface 148, the track controller 108 may disengage the magnetic brake 202 and/or the mechanical blocker 204, 204'. In another example, an employee or other user may indicate at the kiosk 102 that multiple vehicle V are to be returned to the track 110 without activating a pre-determined return routine (e.g., without returning a deposit for each vehicle V). In such an example, the track controller 108, upon receiving confirmation of this intention from the kiosk 102, may disengage the magnetic brake 202 and/or mechanical stopper 204, 204' either for a predetermined amount of time, for a predetermined number of rotations, or until the employee indicates at the kiosk 102 that the returns are complete.

Figure 18:
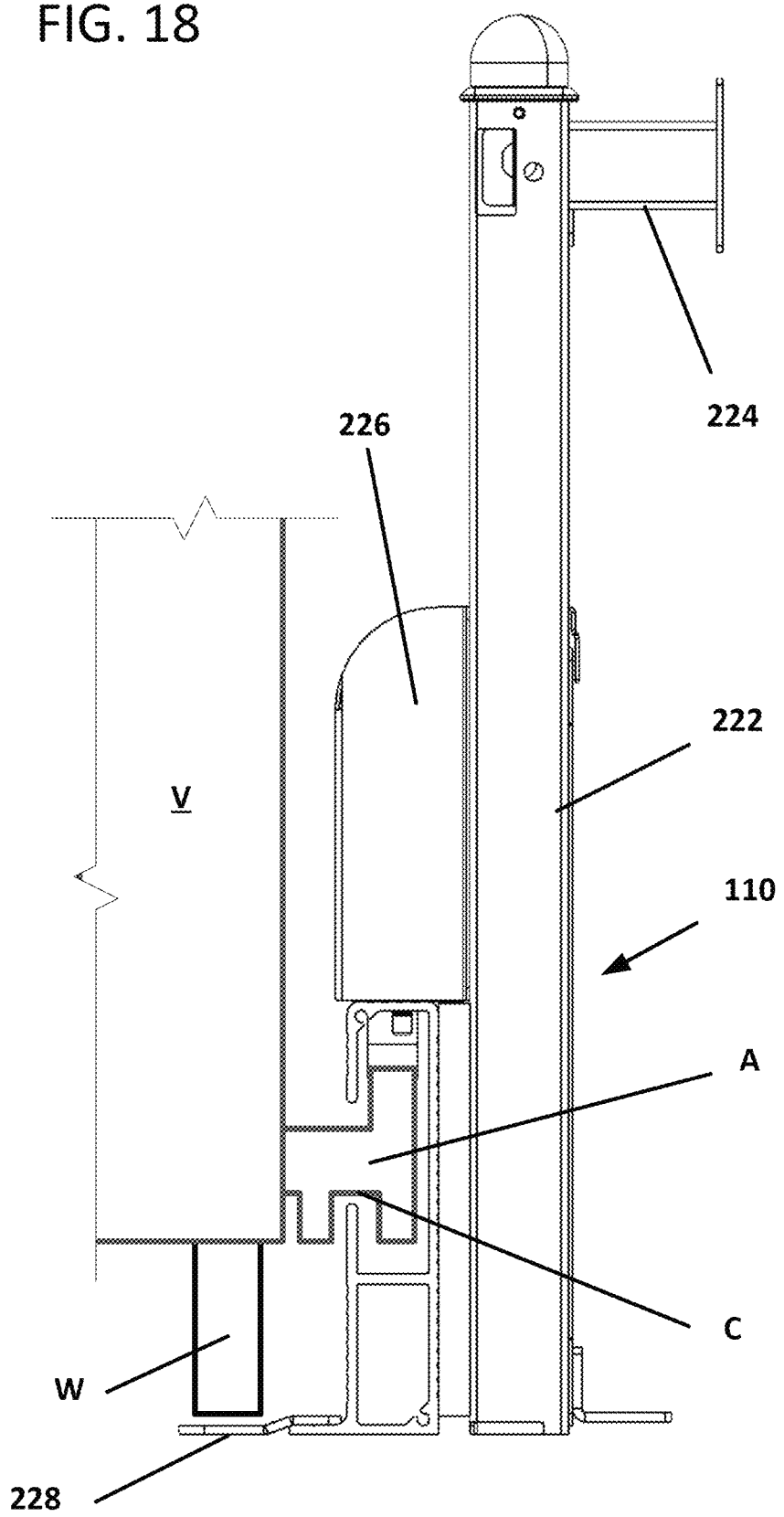
FIG. 18 is an end view of an example track suitable for receiving vehicles having track adapters, the track having a bottom flange over which one or more wheels of the vehicles can ride.

FIG. 18 shows the track 110 combined with an example mounting frame 222 to secure the track 110 is position. The mounting frame 222 includes one or more mounting bars 224 at which the frame 222 and/or track 110 may be secured to a surface. For example, the mounting bar 224 in FIG. 18 assists in securing the frame 222 to a wall. In another example, a mounting bar may assist in securing the track 110 to a floor. A cover 226 may be provided over the dispenser 112, 112' to protect and secure the dispenser components (e.g., the paddle wheel 190). In some examples, the track 110 is configured to receive wheels W of the vehicles V (e.g., see FIGS. 8 and 9). In other examples, the track 110 is configured to receive an adapter A of the vehicle V while the wheels W remain outside of the track 110 (e.g., see FIGS. 15 and 18).

In certain implementations, a flange 228 may extend outwardly from a bottom of the track 110 (e.g., from the track body 180A). The flange 228 provides an even surface over which the wheels W of the vehicles V may roll as the vehicle is moved along the track 110. Accordingly, the flange 228 provides a flat surface relative to the track 110 to assist in aligning the adapter A of the vehicle V with a corresponding passage 182 in the track 110. In certain examples, the flange 228 also provides enhanced stability for the track, which may ease installation and use. In some implementations, the flange 228 is a separate piece fastened or otherwise coupled to the track 110 (e.g., see FIG. 18). In other implementations, the flange 228 is monolithically formed with the track 110.

Aspects of the Disclosure

1. A vending system for a wheeled pushable vehicle, the vending system comprising:
   a vending kiosk including a body having a display screen and a payment acceptor, the body containing a circuit board arrangement having a processor and memory, the memory storing instructions for operating the display screen and the payment acceptor;
   a storage track configured to hold a plurality of wheeled pushable vehicles, the storage track including a dispenser for releasing one pushable vehicle from the storage track at a time, the storage track also including a sensor array; and
   a track controller including a body holding a circuit board arrangement having a processor and memory, the processor and memory of the track controller being separate from the processor and memory of the vending kiosk, the memory of the track controller storing instructions for operating the sensor array and the dispenser of the storage track, the processor of the track controller being in communication with the processor of the vending kiosk to coordinate when to actuate the dispenser to dispense the pushable vehicle.

2. The vending system of aspect 1, wherein the body of the track controller is mounted at the vending kiosk.

3. The vending system of aspect 1, wherein the body of the track controller is attached to the storage track and is separate from the vending kiosk.

4. The vending system of aspect 3, wherein the circuit board arrangement of the vending kiosk includes a first transceiver and the circuit board arrangement of the track controller includes a second transceiver to enable the processor of the track controller to communicate wirelessly with the processor of the vending kiosk.

5. The vending system of aspect 3, further comprising a cable extending between the track controller and the vending kiosk to enable the processor of the track controller to communicate with the processor of the vending kiosk.

6. The vending system of any of aspects 1-5, wherein the storage track includes a communications unit having a hub circuit in communication with the track controller to receive the instructions for operating the sensor array and the dispenser, wherein the storage track does not include local memory storing the instructions for operating the sensor array and the dispenser.

7. The vending system of aspect 6, wherein the communications unit includes a transceiver by which the hub circuit wirelessly connects to the track controller.

8. The vending system of any of aspects 1-7, wherein the storage track is one of a plurality of storage tracks.

9. The vending system of aspect 8, wherein the storage tracks are identical to each other.

10. The vending system of any of aspects 1-9, wherein the memory of the vending kiosk does not store the instructions for operating the sensor array or dispenser.

11. The vending system of any of aspects 1-10, wherein the dispenser is disposed at a dispensing end of the storage track, the dispenser including a paddle wheel that releases one pushable vehicle per indexed position.

12. The vending system of aspect 11, wherein the paddle wheel carries a plurality of magnets to enable the sensor array to determine when the paddle wheel has been indexed.

13. The vending system of aspect 12, wherein rotation of the paddle wheel is limited with a magnetic brake.

14. The vending system of any of aspects 11-13, wherein rotation of the paddle wheel is limited with a blocker moved by a solenoid.

15. The vending system of any of aspects 11-14, wherein the storage track includes a wheel catch.

16. The vending system of any of aspects 11-14, wherein the storage track includes an adapter catch.

17. The vending system of any of aspects 1-10, wherein the dispenser is one of a plurality of dispensers disposed along the storage track, the dispensers being actuated by the track controller.

18. The vending system of any of aspects 1-17, wherein the pushable vehicle includes a stroller.

19. The vending system of any of aspects 1-17, wherein the pushable vehicle includes a cart.

20. A vending system comprising:
    a track defining a channel extending along a longitudinal axis of the track;
    a dispenser mounted to the track at one end of the channel, the dispenser including a paddle wheel having a plurality of spokes, the paddle wheel being mounted so that at least a portion of the paddle wheel is disposed within the channel, at least two spokes of the paddle wheel carrying a unique magnet arrangement, the paddle wheel being configured to rotate between a plurality of indexed positions; and
    a sensor array disposed at the paddle wheel, the sensor array including a plurality of sensors each configured to sense the magnet arrangement of a respective spoke when the spoke is aligned with sensor, the sensor array being coupled to a processor to track a rotational position of the paddle wheel as the paddle wheel is indexed.

21. The vending system of aspect 20, wherein the dispenser includes a magnetic brake that inhibits movement of the paddle wheel when actuated.

22. The vending system of aspect 20 or aspect 21, wherein the dispenser includes an electromechanically controlled blocker to selectively engage and disengage the paddle wheel.

23. The vending system of any of aspects 20-22, wherein the dispenser is configured to rotate in either of two rotational directions.

24. The vending system of any of aspects 20-22, wherein the dispenser is configured to rotate in only one rotational direction.

25. The vending system of any of aspects 20-24, wherein at least a first magnet arrangement includes an outwardly disposed magnet and an inwardly disposed magnet, a second magnet arrangement includes an outwardly disposed magnet only, and a third magnet arrangement includes an inwardly disposed magnet only.

26. The vending system of any of aspects 20-25, wherein the plurality of sensors includes a first sensor and a second sensor.

27. The vending system of aspect 26, wherein the first and second sensors are aligned along a reference axis that intersects the paddle wheel.

28. The vending system of aspect 26, wherein the first and second sensors are aligned along a circumference of a reference cylinder that intersects magnets of two of the magnet arrangements.

29. The vending system of any of aspects 26-28, wherein the plurality of sensors includes a third sensor.

30. A method of tracking pushable vehicles at a storage track, the method comprising:
    monitoring a first sensor array to determine a rotational position of a dispenser;
    sensing a change in the rotational position of the dispenser;
    determining a new rotational position of the dispenser;
    determining a rotational direction of movement of the dispenser based on the new rotational position; and
    inferring that a vehicle has been removed from or returned to the track based on the determined rotational direction of movement.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A vending system for a wheeled pushable vehicle, the vending system comprising:
    a vending kiosk including a body having a display screen, a storage track interface, and a payment acceptor, the body containing a circuit board arrangement having a processor and memory, the memory storing instructions for operating the display screen, the storage track interface, and the payment acceptor;
    a storage track configured to hold a plurality of wheeled pushable vehicles, the storage track including a dispenser for releasing one pushable vehicle from the storage track at a time, the storage track also including a sensor array; and
    a track controller including a kiosk communication interface, the track controller including a body holding a circuit board arrangement having a processor and memory, the processor and memory of the track controller being separate from the processor and memory of the vending kiosk, the memory of the track controller storing instructions for operating the sensor array and the dispenser of the storage track, the processor of the track controller being in communication with the processor of the vending kiosk via the kiosk communication interface and the storage track interface to coordinate when to actuate the dispenser to dispense the pushable vehicle.

2. The vending system of claim 1, wherein the body of the track controller is mounted at the vending kiosk.

3. The vending system of claim 1, wherein the body of the track controller is attached to the storage track and is separate from the vending kiosk.

4. The vending system of claim 3, wherein the circuit board arrangement of the vending kiosk includes a first transceiver and the circuit board arrangement of the track controller includes a second transceiver to enable the processor of the track controller to communicate wirelessly with the processor of the vending kiosk.

5. The vending system of claim 3, further comprising a cable extending between the track controller and the vending kiosk to enable the processor of the track controller to communicate with the processor of the vending kiosk.

6. The vending system of claim 1, wherein the storage track includes a communications unit having a hub circuit in communication with the track controller to receive the instructions for operating the sensor array and the dispenser, wherein the storage track does not include local memory storing the instructions for operating the sensor array and the dispenser.

7. The vending system of claim 1, wherein the storage track is one of a plurality of storage tracks.

8. The vending system of claim 7, wherein the storage tracks are identical to each other.

9. The vending system of claim 1, wherein the dispenser is disposed at a dispensing end of the storage track, the dispenser including a paddle wheel that releases one pushable vehicle per indexed position.

10. The vending system of claim 9, wherein rotation of the paddle wheel is limited with a magnetic brake.

11. The vending system of claim 10, wherein rotation of the paddle wheel is limited with a blocker moved by a solenoid.

12. A vending system comprising:
a track defining a channel extending along a longitudinal axis of the track;
a dispenser mounted to the track at one end of the channel, the dispenser including a paddle wheel having a plurality of spokes, the paddle wheel being mounted so that at least a portion of the paddle wheel is disposed within the channel, at least two spokes of the paddle wheel carrying a unique magnet arrangement, the paddle wheel being configured to rotate between a plurality of indexed positions; and
a sensor array disposed at the paddle wheel, the sensor array including a plurality of sensors each configured to sense the magnet arrangement of a respective spoke when the spoke is aligned with the sensor, the sensor array being coupled to a processor to track a rotational position of the paddle wheel as the paddle wheel is indexed.

13. The vending system of claim 12, wherein the dispenser includes a magnetic brake that inhibits movement of the paddle wheel when actuated.

14. The vending system of claim 12, wherein the dispenser includes an electromechanically controlled blocker to selectively engage and disengage the paddle wheel.

15. The vending system of claim 12, wherein at least a first magnet arrangement includes an outwardly disposed magnet and an inwardly disposed magnet, a second magnet arrangement includes an outwardly disposed magnet only, and a third magnet arrangement includes an inwardly disposed magnet only.

16. The vending system of claim 12, wherein the plurality of sensors includes a first sensor and a second sensor.

17. The vending system of claim 16, wherein the first and second sensors are aligned along a reference axis that intersects the paddle wheel.

18. The vending system of claim 16, wherein the first and second sensors are aligned along a circumference of a reference cylinder that intersects magnets of two of the magnet arrangements.

19. The vending system of claim 16, wherein the plurality of sensors includes a third sensor.

20. A method of tracking pushable vehicles at a storage track, the method comprising:
monitoring a first sensor array to determine a rotational position of a dispenser;
sensing a change in the rotational position of the dispenser including identifying a unique magnet arrangement of a spoke of the dispenser;
determining a new rotational position of the dispenser;
determining a rotational direction of movement of the dispenser based on the new rotational position; and
inferring that a vehicle has been removed from or returned to the track based on the determined rotational direction of movement.

* * * * *